US012169479B2

(12) United States Patent
Kamo et al.

(10) Patent No.: US 12,169,479 B2
(45) Date of Patent: Dec. 17, 2024

(54) UNIFIED STORAGE AND METHOD OF CONTROLLING UNIFIED STORAGE

(71) Applicant: Hitachi, Ltd., Tokyo (JP)

(72) Inventors: Yuto Kamo, Tokyo (JP); Mitsuo Hayasaka, Tokyo (JP); Norio Shimozono, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 22 days.

(21) Appl. No.: 18/176,517

(22) Filed: Mar. 1, 2023

(65) Prior Publication Data

US 2024/0104064 A1 Mar. 28, 2024

(30) Foreign Application Priority Data

Sep. 28, 2022 (JP) ................................ 2022-155471

(51) Int. Cl.
*G06F 3/06* (2006.01)
*G06F 16/182* (2019.01)

(52) U.S. Cl.
CPC .......... *G06F 16/183* (2019.01); *G06F 3/0607* (2013.01); *G06F 3/0617* (2013.01); *G06F 3/0658* (2013.01); *G06F 3/0683* (2013.01)

(58) Field of Classification Search
CPC .... G06F 3/0607; G06F 3/0617; G06F 3/0635; G06F 3/0658; G06F 3/0683; G06F 16/183
See application file for complete search history.

(56) References Cited

U.S. PATENT DOCUMENTS

| | | | | |
|---|---|---|---|---|
| 8,117,387 | B2 | 2/2012 | Matsuki et al. | |
| 8,156,293 | B2 | 4/2012 | Shitomi et al. | |
| 8,356,072 | B1 * | 1/2013 | Chakraborty | H04L 67/1097 709/219 |
| 2008/0244030 | A1 * | 10/2008 | Leitheiser | H04L 67/06 709/211 |
| 2023/0208439 | A1 * | 6/2023 | Hong | G06F 11/1076 714/758 |

* cited by examiner

*Primary Examiner* — Larry T MacKall
(74) *Attorney, Agent, or Firm* — F;Volpe Koenig

(57) ABSTRACT

The present invention makes it possible to maintain availability and scale out file performance, while suppressing costs. A unified storage has a plurality of controllers and a storage apparatus (storage device unit), and each of the plurality of controllers is equipped with one or more main processors (CPU) and one or more channel adapters (FE-I/F). Each main processor causes a block storage control program to operate and thereby process data inputted to and outputted from the storage apparatus, each channel adapter has a processor (CPU) that performs transmission and reception to and from a main processor after receiving an access request, and the processors in the plurality of channel adapters cooperate to cause a distributed file system to operate, and distributively store data, written as a file, to the plurality of controllers.

10 Claims, 21 Drawing Sheets

FIG. 6

[NODE MANAGEMENT TABLE] T11

C11 C12 C13

| NODE ID | CONTROLLER ID | STATE |
|---|---|---|
| 0 | 0 | FAILURE |
| 1 | 0 | FAILURE |
| 2 | 0 | FAILURE |
| 3 | 1 | NORMAL |
| 4 | 1 | NORMAL |
| 5 | 1 | NORMAL |

FIG. 17

[FAILURE PAIR MANAGEMENT TABLE] T12

C21 C22

| NODE ID PAIR | CONTROLLER ID PAIR |
|---|---|
| (0, 3) | (0, 1) |
| (1, 4) | (0, 1) |
| (2, 5) | (0, 1) |

UNIFIED STORAGE AND METHOD OF CONTROLLING UNIFIED STORAGE

BACKGROUND OF THE INVENTION

1. Field of the Invention

The present invention pertains to a unified storage and a method of controlling a unified storage, and is suitable to be applied to a unified storage that functions as a block storage and a file storage and a method of controlling this unified storage.

2. Description of the Related Art

In recent years, various types of data, including structured data such as databases or business systems and unstructured data such as images and videos, are handled. Because a suitable storage system differs according to data, both a block storage and a file storage are necessary to store various types of data. However, costs pile up when a block storage and a file storage are separately purchased. Accordingly, a unified storage which with one device supports a plurality of data access protocols for files and blocks, such as Network File System (NFS)/Common Internet File System (CIFS), iSCSI (Internet Small Computer System Interface), or Fibre Channel (FC) is coming into wide use.

For example, U.S. Pat. No. 8,117,387 (hereinafter referred to as Patent Document 1) discloses a technique for realizing a unified storage by combining a server (a network-attached storage (NAS) head), which performs file processing, with a block storage. In addition, U.S. Pat. No. 8,156,293 (hereinafter referred to as Patent Document 2) discloses a technique for realizing a unified storage by using some resources, such as a central processing unit (CPU) or a memory, of a block storage to perform file processing.

SUMMARY OF THE INVENTION

Incidentally, because file processing has a higher overhead for processing than block processing, it is necessary to scale out file processing. However, unified storages using Patent Documents 1 and 2 have the following problems.

Firstly, with the technique according to Patent Document 1, there is the problem that an additional server (a NAS head) is necessary to realize scaling out of file processing, and costs pile up.

In addition, with the technique according to Patent Document 2, there is the problem that it is not possible to scale out file processing because resources that perform file processing are integrated with the block storage. To give an explanation in detail, a block storage system typically has two storage control modules for high availability, performs failover processing when there is a failure with one storage control module, and continues processing by the other storage control module. The technique according to Patent Document 2 realizes high availability by a similar method by using resources of each storage control module in the block storage, even in file processing. Accordingly, the technique according to Patent Document 2 cannot scale out file performance.

The present invention is made in consideration of the above points, and thus an objective of the present invention is to propose a unified storage that can maintain availability and scale out file performance while suppressing costs, and a method of controlling this unified storage.

In order to achieve the foregoing objective, the present invention provides a unified storage configured to function as a block storage and a file storage, the unified storage having a plurality of controllers that are storage controllers and a storage apparatus, each of the plurality of controllers being equipped with one or more main processors and one or more channel adapters, each main processor processing data inputted to and outputted from the storage apparatus by causing a block storage control program to operate, each channel adapter having a processor, the processor performing transmission and reception to and from the one or more main processors after accepting an access request, and the processors in a plurality of the channel adapters cooperating to cause a distributed file system to operate and make a request to the plurality of controllers to distributively store data that is written as a file.

In addition, in order to achieve the foregoing objective, the present invention provides a method of controlling a unified storage configured to function as a block storage and a file storage, the unified storage having a plurality of controllers that are storage controllers and a storage apparatus, each of the plurality of controllers being equipped with one or more main processors and one or more channel adapters, each main processor processing data inputted to and outputted from the storage apparatus by causing a block storage control program to operate, each channel adapter having a processor, the processor performing transmission and reception to and from the one or more main processors after accepting an access request, and the processors in a plurality of the channel adapters cooperating to cause a distributed file system to operate and distributively store data, written as a file, to the plurality of controllers.

By virtue of the present invention, it is possible to maintain availability and scale out file performance, while suppressing costs.

BRIEF DESCRIPTION OF THE DRAWINGS

FIG. 6 is a view that illustrates an example of a node management table;

FIG. 17 is a view that illustrates an example of a failure pair management table;

DETAILED DESCRIPTION

Figure 1:
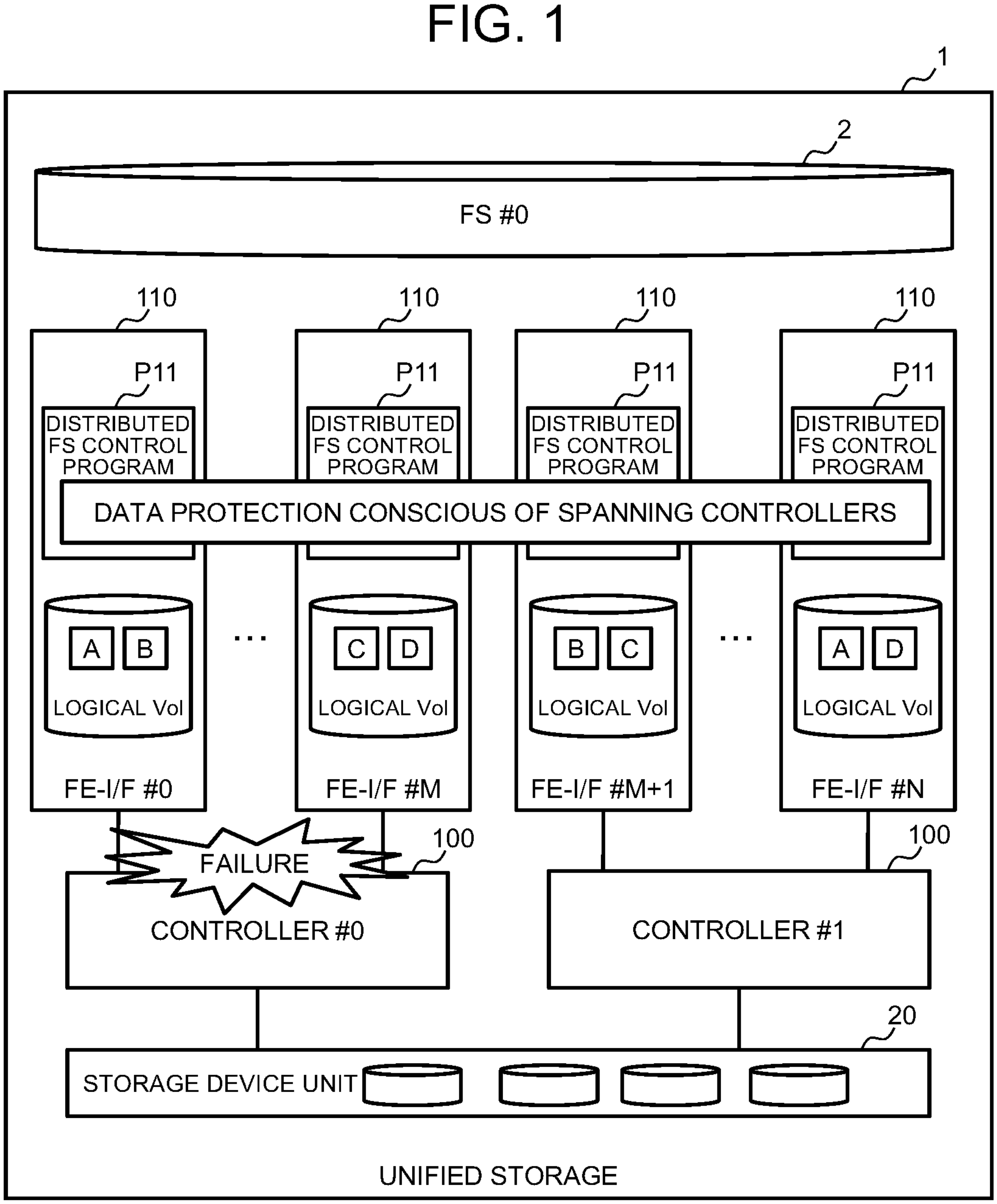
FIG. 1 is a view that illustrates an outline of a unified storage according to a first embodiment.

With reference to the drawings, description is given in detail below regarding embodiments of the present invention.

Note that the following description and the drawings are examples for describing the present invention, and are omitted and simplified, as appropriate, in order to clarify the description. In addition, there is no limitation to all combinations of features described in the embodiments being essential to means for solving the invention. The present invention is not limited to the embodiments, and every possible example of application that matches the idea of the present invention is included in the technical scope of the present invention. A person skilled in the art can make, inter alia, various additions or modifications to the present invention, within the scope of the present invention. The present invention can be implemented in various other forms. Unless otherwise specified, components may be singular or plural.

In the following description, various items of information may be described by expressions such as "table," "list," and "queue," but the various items of information may be expressed as data structures different to these. To indicate independence from a data structure, "xx table," "xx list," etc. may be referred to as "xx information." When describing details for each item of information, in a case where expressions such as "identification information," "identifier," "name," "ID," and "number" are used, these can be mutually interchanged.

In addition, in the following description, it may be that, in a case where description is given without distinguishing elements of the same kind, a reference symbol or a common number from among reference symbols is used and, in a case where description is given while distinguishing elements of the same kind, the reference symbol for the element is used or, in place of the reference symbol, an ID assigned to the element is used.

In addition, in the following description, processing performed by executing a program may be described, but because the program is executed by at least one or more processor (for example, a CPU) to perform defined processing while appropriately using a storage resource (for example, a memory) and/or an interface device (for example, a communication port) or the like, the processor may be given as the performer of the processing. Similarly, the performer of processing performed by executing a program may be a controller, an apparatus, a system, a computer, a node, a storage system, a storage apparatus, a server, a management computer, a client, or a host that each have a processor. The performer (for example, a processor) of processing performed by executing a program may include a hardware circuit that performs some or all of the processing. For example, the performer of processing performed by executing a program may include a hardware circuit that executes encryption and decryption or compression and decompression. A processor operates in accordance with a program to thereby operate as a functional unit for realizing a predetermined function. An apparatus and a system that include the processor are an apparatus and system that include such functional units.

A program may be installed to an apparatus such as a computer from a program source. The program source may be a non-transitory storage medium that can be read by a program distribution server or a computer, for example. In a case where the program source is in a program distribution server, it may be that the program distribution server includes a processor (for example, a CPU) and a non-transitory storage resource, and the storage resource also stores a distribution program and a program to be distributed. It may be that the processor in the program distribution server executes the distribution program, whereby the processor in the program distribution server distributes the program to be distributed to another computer. In addition, in the following description, two or more programs may be realized as one program, and one program may be realized as two or more programs.

(1) First Embodiment

A unified storage 1 according to a first embodiment of the present invention mounts one or more high-performance front-end interfaces (FE-I/Fs) in each of a plurality of storage controllers (hereinafter referred to simply as controllers), and uses CPUs and memories in the FE-I/Fs to cause a distributed file system (distributed FS) to operate. The distributed FS is configured to recognize each controller and distributively dispose data on the controllers while protecting data by storing data by a redundant configuration in which data is present across two or more controllers, such that data is not present in only one controller.

A detailed internal configuration is described below, but a high-performance FE-I/F equipped in the unified storage 1 is a channel adapter having a processor (for example, a CPU) or the like, and is specifically a smart network interface card (NIC), for example. It is known that such a channel adapter as a Smart NIC is cheaper than a server such as a NAS head.

FIG. 1 is a view that illustrates an outline of the unified storage 1 according to the first embodiment.

As illustrated in FIG. 1, in the unified storage 1, a #0 controller 100 and a #1 controller 100 are each connected to one or more FE-I/Fs 110. A distributed file system control program P11 operates in each FE-I/F 110 to thereby configure a distributed FS 2.

The distributed file system control program P11 requests processors in two or more controllers 100 to store data by having a redundant configuration between the controllers 100. To describe in detail, a block storage control program P1 (refer to FIG. 2) in a controller 100 provides a volume, the processors in the FE-I/Fs 110 store data to this volume, and one controller 100 can provide a plurality of volumes. A distributed file system that operates in accordance with the distributed file system control program P11 recognizes each controller 100 and protects data by distributively storing a plurality of items of data (user data A, B, C, and D), corresponding to a file for which a write request has been made, to a plurality of volumes (a plurality of logical volumes used by the FE-I/F 110 mounted to each controller 100) corresponding to each controller 100, to achieve redundancy between the plurality of controllers 100 (the #0 and #1 controllers 100). Each FE-I/F 110 also processes block protocol access and not just a file protocol.

Here, for example, when a failure occurs in the #0 controller 100 as illustrated in FIG. 1, it ceases to be possible to access the FE-I/F 110 connected to the #0 controller 100. However, the unified storage 1 protects data across the controllers 100 as described above, and thus, even after the occurrence of a failure, can continue to access data via the distributed file system control program P11 in the FE-I/F 110 connected to the #1 controller 100.

Figure 2:
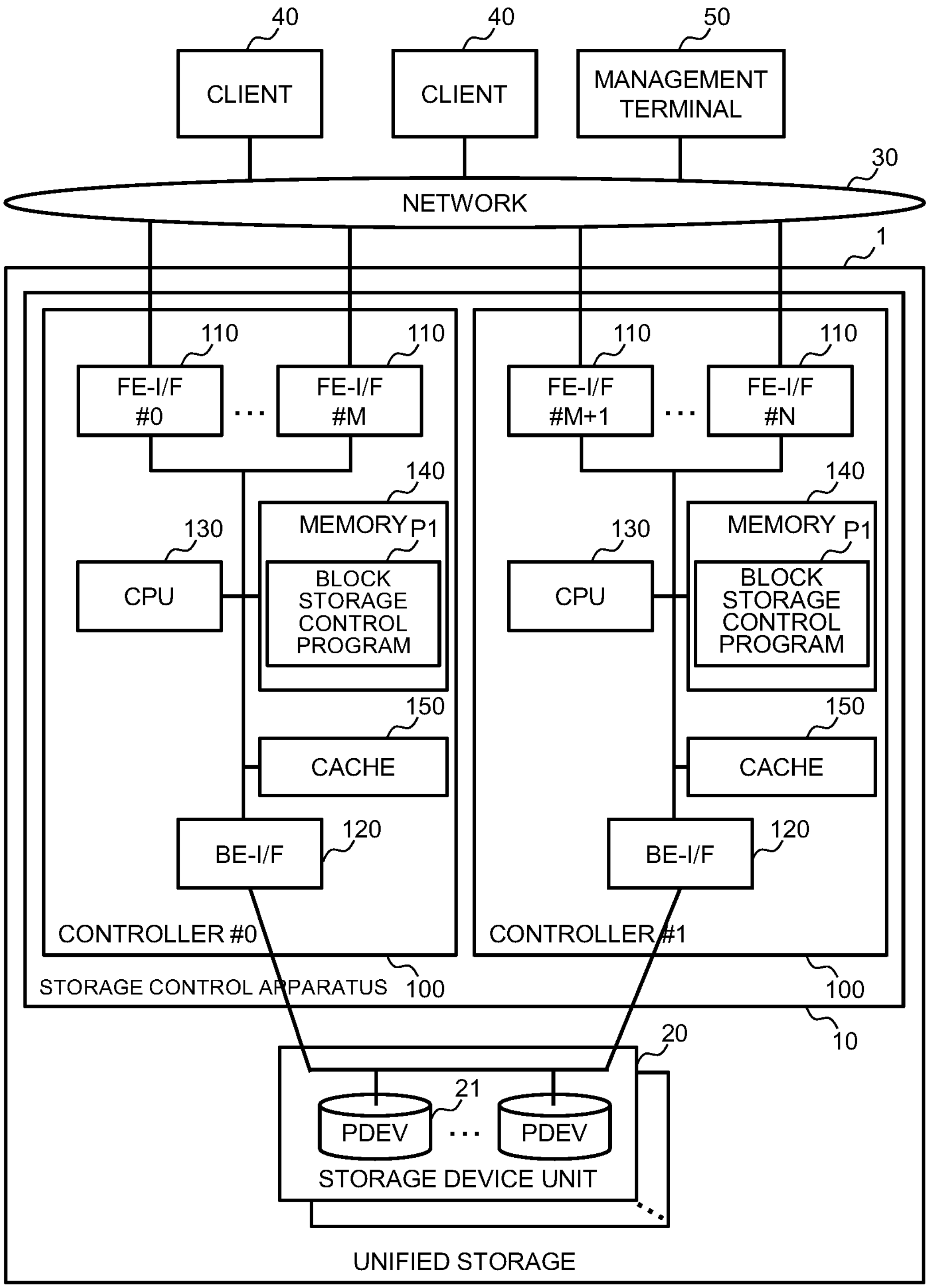
FIG. 2 is a view that illustrates an example of a configuration of the entirety of a storage system that includes the unified storage.

FIG. 2 is a view that illustrates an example of a configuration of the entirety of a storage system that includes the unified storage 1. As illustrated in FIG. 2, the unified storage 1 is connected to clients 40 and a management terminal 50 via a network 30.

The unified storage 1 has a storage control apparatus 10 and a storage device unit 20.

The storage control apparatus 10 has a plurality of controllers 100. In the case in FIG. 2, two controllers 100, "#0" and "#1," are illustrated, but the number of controllers 100 held by the storage control apparatus 10 may be three or more.

Note that, although not illustrated in FIG. 2, in order to improve the availability of the unified storage 1, the storage control apparatus 10 may prepare a dedicated power supply for each controller 100 and supply power to each controller 100 by using the dedicated power supply.

In addition, in the case in FIG. 2, although one storage control apparatus 10 is illustrated, the unified storage 1 may have a plurality of storage control apparatuses 10 and, in this case, for example, a configuration may be taken to connect controllers 100 in each storage control apparatus 10 with each other via a Host Channel Adaptor (HCA) network.

Each controller 100 has one or more FE-I/Fs 110, a backend interface (BE-I/F) 120, one or more CPUs 130, a memory 140, and a cache 150. These are connected to each other by a communication channel such as a bus, for example.

Note that an FE-I/F 110 in the present embodiment may be realized by a configuration that is integrated with a controller 100, or may be realized by a separate apparatus (device) that can be mounted in a controller 100. In order to facilitate understanding of a connection relation, FIG. 2 illustrates a state in which FE-I/Fs 110 are mounted to each controller 100. Illustration of such a state is similar in, inter alia, FIG. 12 described below.

A FE-I/F 110 is an interface device for communicating with an external device present on the front end, such as a client 40. A distributed FS operates on the FE-I/F 110. A distributed FS may operate on a freely-defined number of FE-I/Fs 110 from among the plurality of FE-I/Fs 110. The BE-I/F 120 is an interface device for the controller 100 to communicate with the storage device unit 20.

A CPU 130 is an example of a processor that performs operation control for block storage. The memory 140 is, for example, a random-access memory (RAM) and temporarily stores a program and data for operation control by the CPU 130. The memory 140 stores the block storage control program P1. Note that the block storage control program P1 may be stored in the storage device unit 20. The block storage control program P1 is a control program for block storage, and is a program for processing data inputted to and outputted from the storage device unit 20. Specifically, for example, the block storage control program P1 provides the FE-I/F 110 with a logical volume (logical Vol in FIG. 1), which is a logical storage region based on the storage device unit 20. The FE-I/F 110 can access any logical volume by designating an identifier for the logical volume.

The cache 150 temporarily stores data written by a block protocol from a client 40 or a distributed FS that operates on the FE-I/F 110, and data read from the storage device unit 20.

The network 30 is specifically, for example, a local area network (LAN), a wide area network (WAN), a storage area network (SAN), or the like.

A client 40 is an apparatus that accesses the unified storage 1, and transmits a data input/output request (a data write request or a data readout request) in units of blocks or units of files to the unified storage 1.

The management terminal 50 is a computer terminal operated by a user or an operator. The management terminal 50 is provided with a user interface in accordance with, inter alia, a graphical user interface (GUI) or a command-line interface (CLI), and provides functionality for the user or operator to control or monitor the unified storage 1.

The storage device unit 20 has a plurality of physical devices (PDEVs) 21. A PDEV 21 is, for example, a hard disk drive (HDD), but may be another type of non-volatile storage device, including a flash memory device such as a solid-state drive (SSD), for example. The storage device unit 20 may have different types of PDEVs 21. In addition, a group of a redundant array of independent disks (RAID) may be configured by a plurality of PDEVs 21 of the same type. Data is stored to the RAID group according to a predetermined RAID level.

Figure 3:
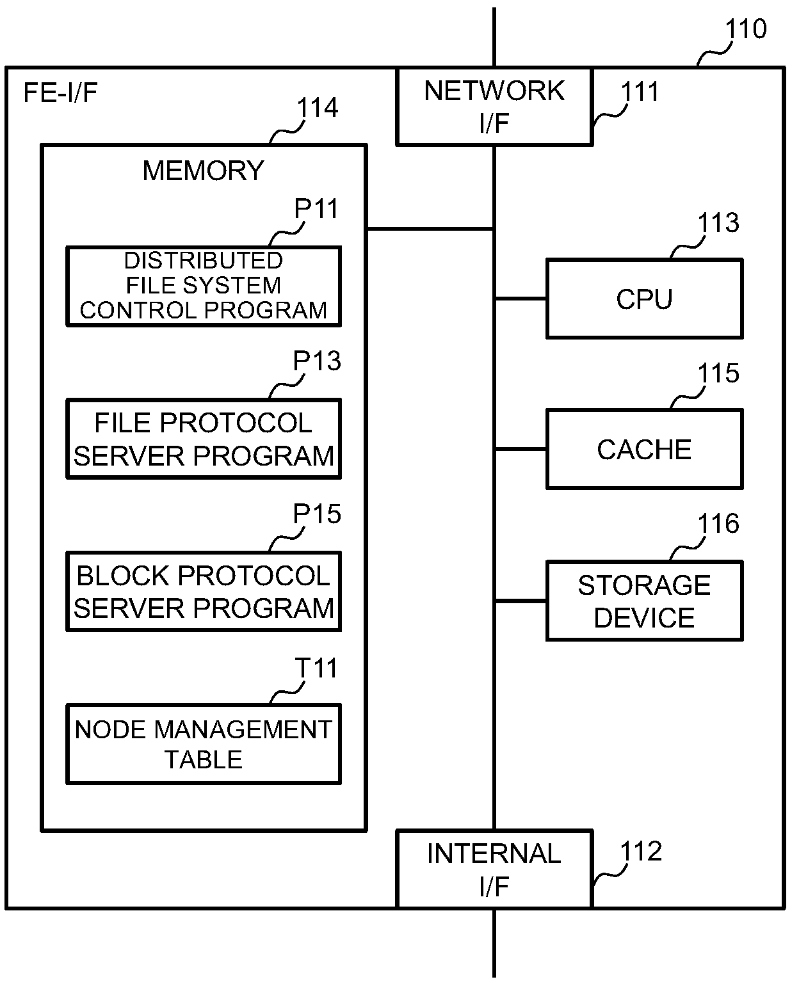
FIG. 3 is a view that illustrates an example of a configuration of an FE-I/F.

FIG. 3 is a view that illustrates an example of a configuration of an FE-I/F 110. As illustrated in FIG. 3, the FE-I/F 110 has a network I/F 111, an internal I/F 112, a CPU 113, a memory 114, a cache 115, and a storage device 116. These components are connected to each other through a communication channel such as a bus, for example.

The network I/F 111 is an interface device for communicating with an external device such as a client 40 or with another FE-I/F 110. Note that communication with an external device such as a client 40 and communication with another FE-I/F 110 may be performed by different network I/Fs. The internal I/F 112 is an interface device for communicating with the block storage control program P1. The internal I/F 112 is connected with, inter alia, the CPU 130 in the controller 100 by Peripheral Component Interconnect Express (PCIe), for example.

The CPU 113 is a processor that performs operation control of the FE-I/F 110. The memory 114 temporarily stores programs and data used for the operation control by the CPU 113. The CPU 113 accepts an access request to thereby perform transmission and reception to and from a processor (CPU 130) in the controller 100. The CPUs 113 in a plurality of FE-I/Fs 110 cooperate to cause a distributed file system 2 to operate, and make a request to the plurality of controllers 100 to distributively store data that is written as a file.

The memory 114 stores a distributed file system control program P11, a file protocol server program P13, a block protocol server program P15, and a node management table T11. Note that it may be that the memory 114 stores only the block protocol server program P15, or it may be that the memory 114 stores only the distributed file system control program P11, the file protocol server program P13, and the node management table T11, and not the block protocol server program P15. In addition, respective programs and data stored to the memory 114 may be stored to the storage device 116.

The distributed file system control program P11 is executed by the CPU 113 to thereby cooperate with the distributed file system control program P11 in another FE-I/F 110 to manage and control the distributed file system and provide the distributed file system (FS 2 in FIG. 1) to the file protocol server program P13. The distributed file system control program P11 distributively disposes data to each FE-I/F 110, and stores data to a logical volume allocated to itself. Storage of data to a logical volume may be performed via the block protocol server program P15 or may be performed by directly communicating with the block storage control program P1 stored in the memory 140 of the controller 100, using the internal I/F 112.

The file protocol server program P13 receives various requests for, inter alia, a read or a write from a client 40 or the like, and processes a file protocol included in such requests. A file protocol processed by the file protocol server program P13 is specifically, for example, NFS, CIFS, a file-system-specific protocol, Hypertext Transfer Protocol (HTTP), or the like.

The block protocol server program P15 receives various requests for, inter alia, a read or a write from a client 40 or the like, and processes a block protocol included in such requests. A block protocol processed by the block protocol server program P15 is specifically, for example, iSCSI, FC, or the like.

The cache 115 temporarily stores data written from a client 40, or data read from the block storage control program P1.

The storage device 116 stores, inter alia, an operating system or management information for the FE-I/F 110.

Figure 4:
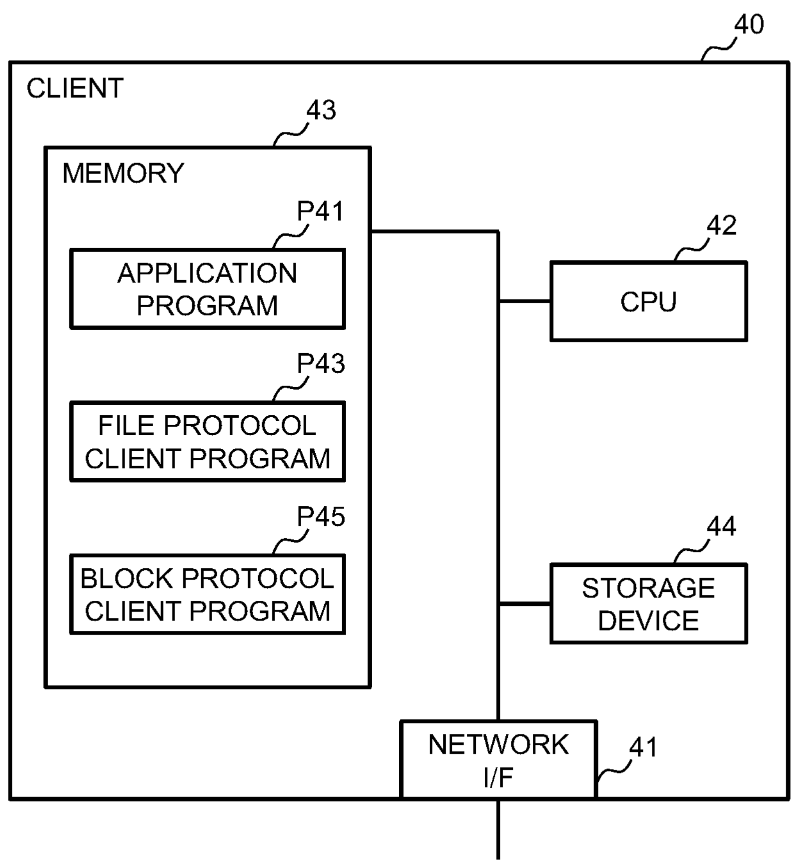
FIG. 4 is a view that illustrates an example of a configuration of a client.

FIG. 4 is a view that illustrates an example of a configuration of a client 40. As illustrated in FIG. 4, the client 40 has a network I/F 41, a CPU 42, a memory 43, and a storage device 44. These components are connected to each other through a communication channel such as a bus, for example.

The network I/F 41 is an interface device for communicating with the unified storage 1.

The CPU 42 is a processor that performs operation control for the client 40. The memory 43 temporarily stores programs and data used for the operation control by the CPU 42. The memory 43 stores an application program P41, a file protocol client program P43, and a block protocol client program P45. Note that it may be the memory 43 stores only the application program P41 and the block protocol client program P45, or it may be that the memory 43 stores only the application program P41 and the file protocol client program P43. In addition, respective programs and data stored to the memory 43 may be stored to the storage device 44.

The application program P41 is executed by the CPU 42 to thereby make a request to the file protocol client program P43 and the block protocol client program P45 and read and write data from and to the unified storage 1.

The file protocol client program P43 receives various requests for, inter alia, a read or a write from the application program P41 or the like, and processes a file protocol included in such requests. A file protocol processed by the file protocol client program P43 is specifically, for example, NFS, CIFS, a file-system-specific protocol, HTTP, or the like. In addition, in a case where a file protocol processed by the file protocol client program P43 is a protocol that supports data distribution such as Parallel NFS (pNFS) or a client-specific protocol (for example, Ceph), it may be that the file protocol client program P43 calculates a storage destination node (target data storage destination node calculation illustrated in FIG. 9) for data.

The block protocol client program P45 receives various requests for, inter alia, a read or a write from a client 40 or the like, and processes a block protocol included in such requests. A block protocol processed by the block protocol client program P45 is specifically, for example, iSCSI, FC, or the like.

The storage device 44 stores, inter alia, an operating system or management information for the client 40.

Figure 5:
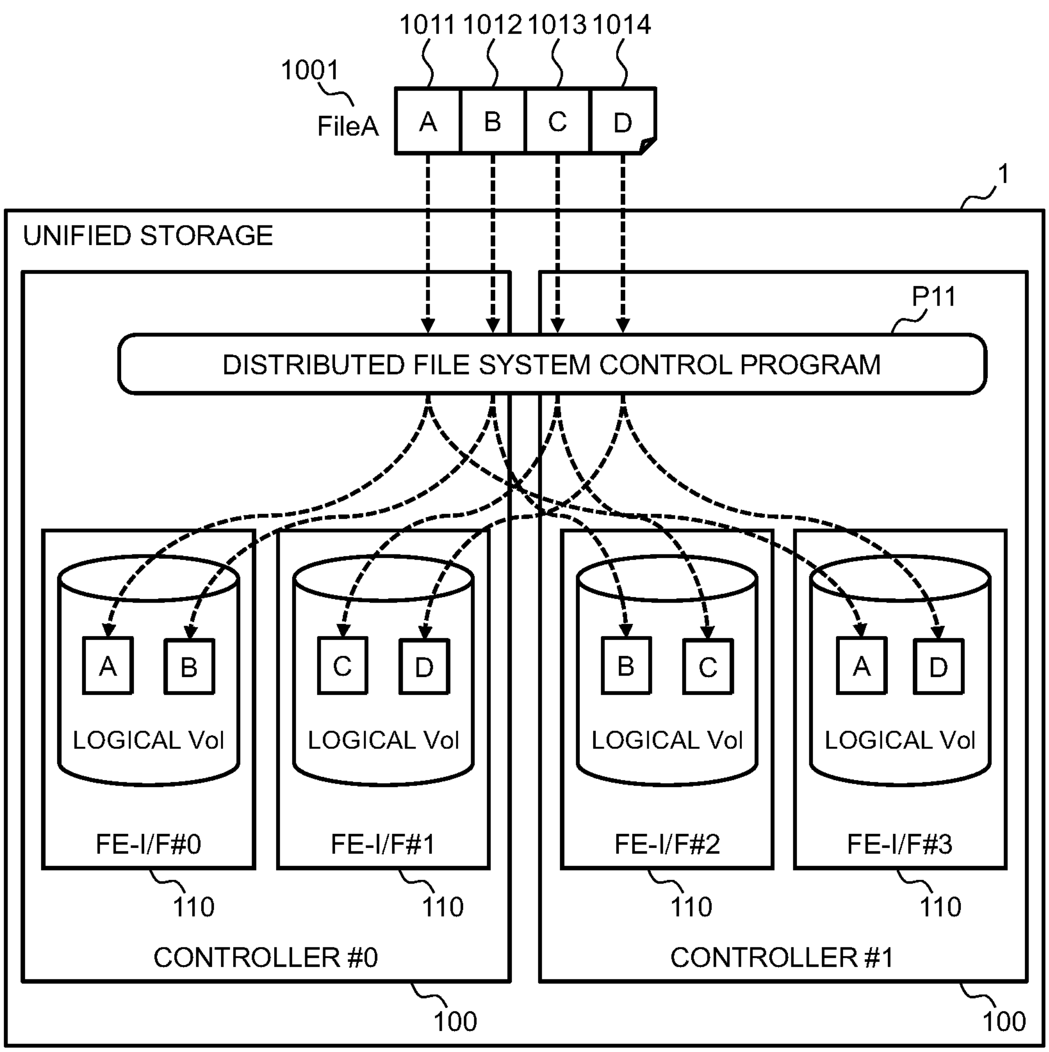
FIG. 5 is a view that illustrates an example of a depiction of data distribution in the first embodiment.

FIG. 5 is a view that illustrates an example of a depiction of data distribution in the first embodiment. In the unified storage 1 according to the present embodiment, a file received from a client 40 by using the distributed file system control program P11 is stored in units of chunks to logical volumes in FE-I/Fs 110 across a plurality of controllers 100, whereby data is protected. Further, in each controller 100, the file is distributively disposed in a plurality of logical volumes in the FE-I/Fs 110.

Specifically, in the case in FIG. 5, regarding a file 1001 (FileA) configured from chunks 1011 to 1014, for example, the distributed file system control program P11 determines the "#0" FE-I/F 110 in the "#0" controller 100 and the "#3" FE-I/F 110 in the "#1" controller 100 as FE-I/Fs 110 for managing the chunk 1011 (chunk A). In addition, the "#0" FE-I/F 110 in the "#0" controller 100 and the "#2" FE-I/F 110 in the "#1" controller 100 are determined as FE-I/Fs 110 for managing the chunk 1012 (chunk B). In addition, the "#1" FE-I/F 110 in the "#0" controller 100 and the "#2" FE-I/F 110 in the "#1" controller 100 are determined as FE-I/Fs 110 for managing the chunk 1013 (chunk C). In addition, the "#1" FE-I/F 110 in the "#0" controller 100 and the "#3" FE-I/F 110 in the "#1" controller 100 are determined as FE-I/Fs 110 for managing the chunk 1014 (chunk D). The distributed file system control program P11 in each FE-I/F 110 stores the chunks A, B, C, and D to logical volumes in FE-I/Fs 110 that manage the respective chunks A, B, C, and D.

Note that, in a case where the number of controllers 100 is three or more, it may be that data is distributively disposed among controllers 100 in addition to just within a controller 100. In this case, data protection may be in triplicate or better data protection in which the same data is stored to three or more FE-I/Fs 110 instead of duplicative data protection in which the same data is stored to two FE-I/Fs 110.

In addition, the above-described distributive disposition of data is not limited to user data. File metadata or file system metadata may similarly be subjected to data protection that is across controllers 100, and may distributively be disposed among FE-I/Fs 110.

FIG. 6 is a view that illustrates an example of a node management table T11. The node management table T11 manages which FE-I/F 110 (node) is connected to which controller 100, and whether or not a failure has arisen for a node. For example, the management terminal 50 monitors for a failure, and updates the node management table T11 on the basis of a monitoring result. In the unified storage 1, each FE-I/F 110 holds the same node management table T11.

The node management table T11 illustrated in FIG. 6 is configured by having a node ID C11, a controller ID C12, and a state C13. The node ID C11 is an identifier assigned for each FE-I/F 110. The controller ID C12 is an identifier assigned for each controller. The state C13 indicates whether or not a failure has occurred for a node, and holds a value for "normal" or "failure" in the present example. In a case where a failure has occurred for a controller 100, a node (FE-I/F 110) connected to the controller 100 also enters a "failure" state.

Figure 7:
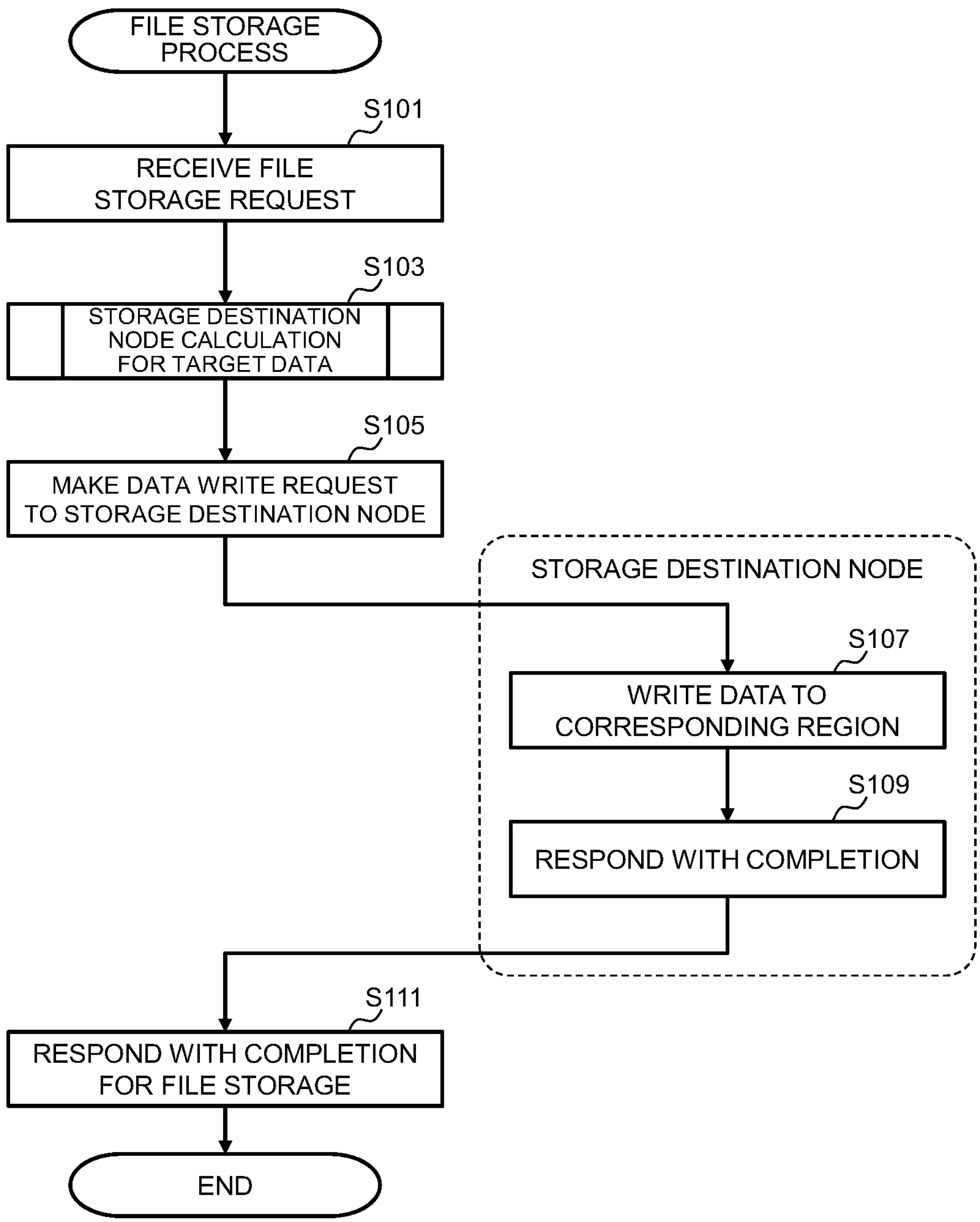
FIG. 7 is a flow chart that illustrates an example of a processing procedure for a file storage process.

FIG. 7 is a flow chart that illustrates an example of a processing procedure for a file storage process. The file storage process illustrated in FIG. 7 is executed in a case where one FE-I/F 110 has accepted a file storage request from a client 40. The file storage process is performed by the CPU 113 in an FE-I/F 110 mounted to a controller 100 executing the file protocol server program P13 and the distributed file system control program P11.

According to FIG. 7, firstly, the file protocol server program P13 that has received the file storage request from the client 40 executes protocol processing to request the distributed file system control program P11 to store the file (step S101).

Next, the distributed file system control program P11 calculates a storage destination node for storing target data (the file) (step S103). A detailed processing procedure for calculating the storage destination node for target data is described below with reference to FIG. 9 and FIG. 10. Note that there are cases where, due to a data write offset and size, target data is divided into a plurality of chunks (refer to FIG. 5). In this case, the distributed file system control program P11 calculates a storage destination node for each chunk in step S103.

Next, the distributed file system control program P11 requests the storage destination node calculated in step S103 to write the target data (step S105). Note that, in a case where the target data is divided into a plurality of chunks, the distributed file system control program P11 executes the processing in step S105 for each chunk. In addition, write requests for a plurality of chunks may be performed in parallel.

Note that, in a case where a file protocol processed by the file protocol client program P43 in the client 40 is a protocol that supports data distribution such as pNFS or a client-specific protocol, the processing in steps S101 to S105 is performed by the client 40.

Next, with respect to the data write request in step S105, the distributed file system control program P11 in the storage destination node (FE-I/F 110) for the target data, upon receiving the data write request, performs a process for writing the data to a region corresponding to the data (step S107). When the process for writing the data completes, the distributed file system control program P11 makes a completion response with respect to the data write request in step S105 (step S109).

Next, in the node (FE-I/F 110) that has received the file storage request from the client 40, the distributed file system control program P11 receives the completion response with respect to the data write request, from the distributed file system control program P11 in the storage destination node, and makes a file storage completion response to the file protocol server program P13. Further, the file protocol server program P13 performs protocol processing and makes a completion response, with respect to the file storage request, to the client 40 (step S111), and the file storage process ends.

Figure 8:
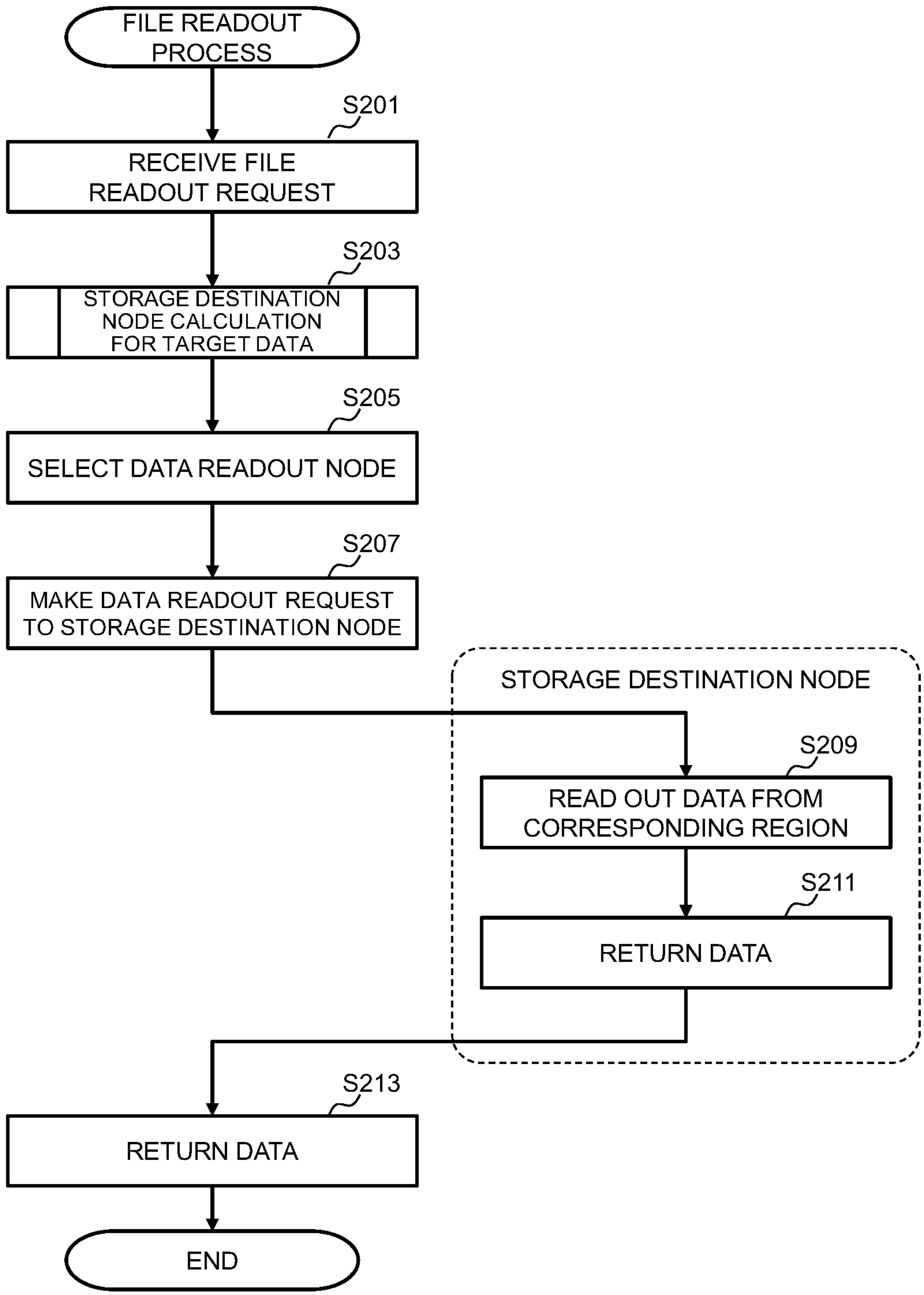
FIG. 8 is a flow chart that illustrates an example of a processing procedure for a file readout process.

FIG. 8 is a flow chart that illustrates an example of a processing procedure for a file readout process. The file readout process illustrated in FIG. 8 is executed in a case where one FE-I/F 110 has accepted a file readout request from a client 40. The file readout process is performed by the CPU 113 in an FE-I/F 110 mounted to a controller 100 executing the file protocol server program P13 and the distributed file system control program P11.

According to FIG. 8, firstly, the file protocol server program P13 that has received the file readout request from the client 40 executes protocol processing to request the distributed file system control program P11 to read out the file (step S201).

Next, the distributed file system control program P11 calculates the storage destination node that stores target data (the file) (step S203). A process for calculating the storage destination node for target data is similar to step S103 in FIG. 7, and a detailed processing procedure for this process is described below with reference to FIG. 9 and FIG. 10. Note that there are cases where, due to a data readout offset and size, the target data is divided into a plurality of chunks. In this case, the distributed file system control program P11 calculates a storage destination node for each chunk in step S203.

Next, the distributed file system control program P11, referring to the node management table T11, confirms whether or not the target data storage destination node calculated in step S203 is in a normal state, and selects a storage destination node in the normal state (step S205). To give a description in detail, in a case where any storage destination node is in a failure state, the distributed file system control program P11 selects a storage destination node that is in the normal state. In addition, if all of the storage destination nodes are in the failure state, the distributed file system control program P11 returns an error to the client 40, and ends the file readout process.

Next, the distributed file system control program P11 requests the storage destination node selected in step S205 to read out the target data (step S207). Note that, in a case where the target data is divided into a plurality of chunks, the distributed file system control program P11 executes the processing in steps S205 and S207 for each chunk. In addition, readout requests for a plurality of chunks may be performed in parallel.

Note that, in a case where a file protocol processed by the file protocol client program P43 in the client 40 is a protocol that supports data distribution such as pNFS or a client-specific protocol, the processing in steps S201 to S207 is performed by the client 40.

Next, with respect to the data readout request in step S207, the distributed file system control program P11 in the storage destination node (FE-I/F 110) for the target data, upon receiving the data readout request, performs a process for reading out data from a region corresponding to the data (step S209). When processing for reading out the data completes, the distributed file system control program P11 returns the data that has been read out (readout data) to the request source for the data readout request (step S211).

Next, in the node (FE-I/F 110) that has received the file readout request from the client 40, the distributed file system control program P11 receives the readout data from the distributed file system control program P11 in the storage destination node, and returns the readout data to the file protocol server program P13 (step S213). Further, the file protocol server program P13 performs protocol processing and returns the readout data to the client 40 (step S213), and the file readout process ends.

Figure 9:
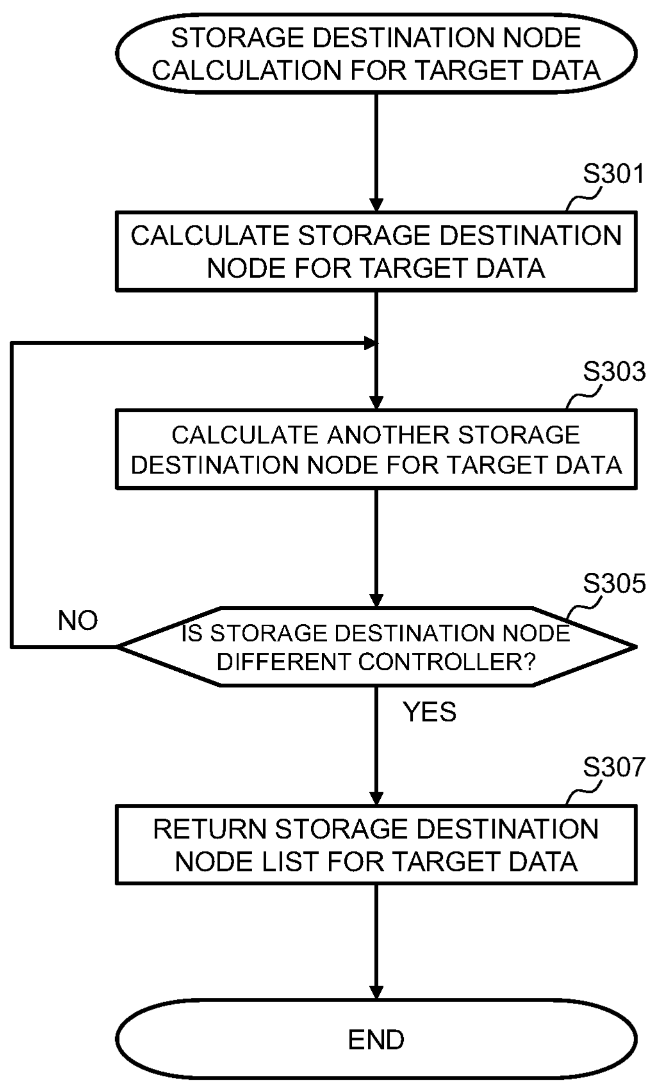
FIG. 9 is a flow chart that illustrates an example of a processing procedure for a target data storage destination node calculation.

FIG. 9 is a flow chart that illustrates an example of a processing procedure for a target data storage destination node calculation. The processing illustrated in FIG. 9 is executed by being called in step S103 in the file storage process illustrated in FIG. 7 or in step S203 in the file readout process illustrated in FIG. 8.

According to FIG. 9, firstly, the distributed file system control program P11 calculates one storage destination node for target data (step S301). Specifically, the distributed file system control program P11 determines, on the basis of a file name and a chunk offset, a logical volume in an FE-I/F 110 that stores or is for storing "target data" designated by the file readout request in Step S201 or the file storage request in step S101. For example, a hash value for the file name and chunk offset is calculated, and the logical volume in the FE-I/F 110 is determined on the basis of this hash value. By performing such processing, it is possible to distributively dispose data. Note that there is no limitation to using a file name and a chunk offset and, for example, a determination may alternatively be made on the basis of information such as a file mode number and a chunk serial number, for example.

Next, the distributed file system control program P11 calculates another storage destination node for the target data (step S303). A calculation method may be similar to that in step S301, but processing in this step calculates a hash value after adding a value (for example, 1, 2, 3, . . . ), which is the same each time a storage destination node is calculated for the same data, to the file name and the chunk offset.

Next, the distributed file system control program P11, referring to the node management table T11, confirms whether or not the storage destination node obtained in step S301 and the storage destination node obtained in step S303 are connected to different controllers 100 (step S305). In a case where the two storage destination nodes are connected to different controllers 100 (YES in step S305), the process proceeds to step S307. In contrast, in a case where the two storage destination nodes are connected to the same controller 100 (NO in step S305), the value is changed (for example, if the value added to the offset in the immediately prior step S303 is 1, the value is changed to 2, etc.), step S303 is returned to, and a storage destination node is calculated again.

In step S307, the distributed file system control program P11 returns, to the call source node (FE-I/F 110), a target data storage destination node list resulting from converting the storage destination nodes calculated in step S301 and step S303 into a list, and ends the processing.

By virtue of the processing for calculating a target data storage destination node as above, it is possible to select nodes (FE-I/Fs 110) in a plurality of controllers 100 as target data storage destination nodes. Accordingly, it is possible to realize data protection that is across controllers 100. Further, a hash value is used for each item of data, whereby it is possible to distributively dispose data to respective nodes connected to the same controller 100.

Note that, although description is given by taking duplicative data protection as illustrated in FIG. 1 or FIG. 5 as an example, the unified storage 1 according to the present embodiment may perform triplicate data protection with two or more controllers 100. In a case of performing triplicate data protection, a third storage destination node may be a storage destination node that differs to the two storage destination nodes, without limitation to a controller 100. In addition, in a case where there are three or more controllers 100, processing in step S303 and step S305 may repeatedly be executed such that it is possible to select three storage destination nodes connected to respective different controllers 100.

Regarding which controller 100 a calculated storage destination node is connected to, the target data storage destination node calculation method illustrated in FIG. 9 has deviation arise due to the number of FE-I/Fs 110 mounted to each controller 100. Accordingly, the calculation method illustrated in FIG. 9 is suitable for, inter alia, a case of attempting to store target data in consideration of variation of resources in the storage control apparatus 10.

Figure 10:
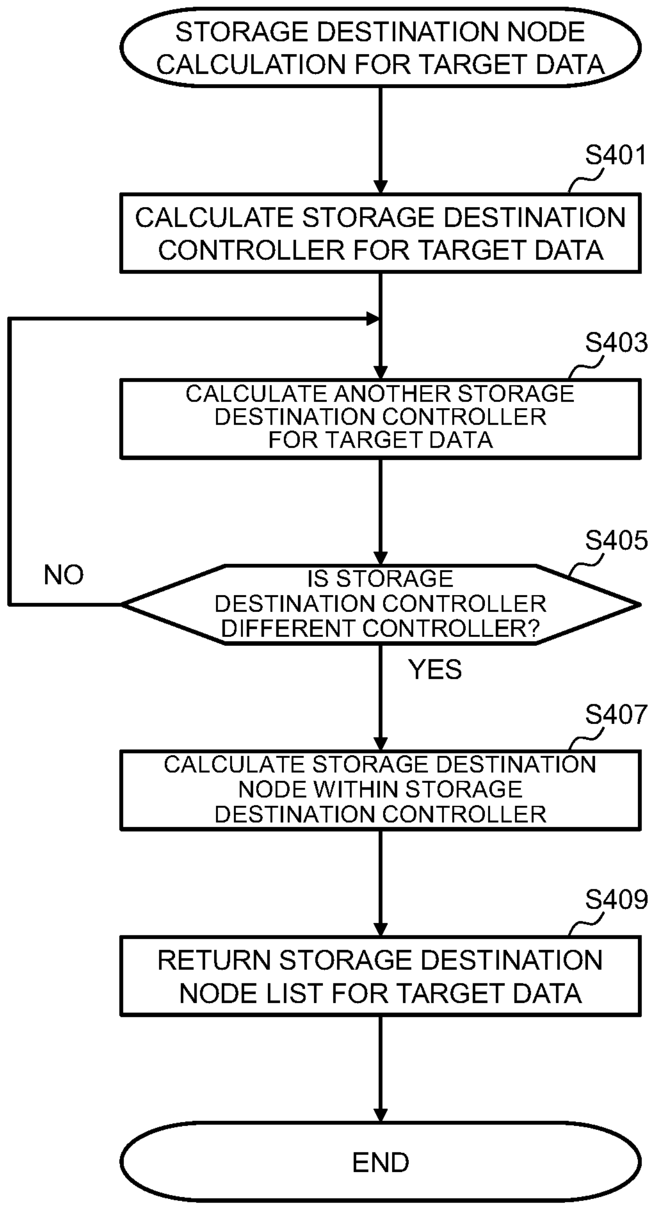
FIG. 10 is a flow chart that illustrates another example of the processing procedure for the target data storage destination node calculation.

FIG. 10 is a flow chart that illustrates another example of the processing procedure for the target data storage destination node calculation. Similarly to the processing in FIG. 9, the processing illustrated in FIG. 10 is executed by being called in step S103 in the file storage process illustrated in FIG. 7 or in step S203 in the file readout process illustrated in FIG. 8.

Note that the processing in FIG. 10 is mainly premised on the storage control apparatus 10 having three or more controllers 100, but can be executed even if the number of controllers 100 is two. In a case where the number of controllers 100 is two, each controller 100 may be selected without performing processing for steps S401 through S405 described below.

According to FIG. 10, firstly, the distributed file system control program P11 calculates one storage destination controller for target data (step S401). Specifically, the distributed file system control program P11 determines, on the basis of a file name and a chunk offset, a controller 100 that stores or is for storing "target data" designated by the file readout request in step S201 or the file storage request in step S101. For example, a hash value for the file name and the chunk offset is calculated, and the controller 100 is determined on the basis of this hash value. Note that there is no limitation to using a file name and a chunk offset and, for example, a determination may alternatively be made on the basis of information such as a file mode number and a chunk serial number, for example.

Next, the distributed file system control program P11 calculates another storage destination controller for the target data (step S403). A calculation method may be similar to that in step S401, but processing in this step calculates a hash value after adding a value (for example, 1, 2, 3, . . . ), which is the same each time a storage destination controller is calculated for the same data, to the file name and the chunk offset.

Next, the distributed file system control program P11 confirms whether or not the controller 100 obtained in step S401 and the controller 100 obtained in step S403 are different controllers (step S405). In a case where the two controllers 100 are different (YES in step S405), step S407 is advanced to. In contrast, in a case where the two controllers 100 are the same controller (NO in step S405), the value is changed (for example, if the value added to the offset in the immediately prior step S403 is 1, the value is changed to 2, etc.), step S403 is returned to, and a storage destination controller is calculated again.

In step S407, the distributed file system control program P11 calculates a target data storage destination node in each controller 100 obtained as a storage destination controller. Specifically, the distributed file system control program P11 determines, on the basis of the file name and the chunk offset, a logical volume in an FE-I/F 110 for storing the target data. For example, a hash value for the file name and the chunk offset is calculated, and the logical volume in the FE-I/F 110 is determined on the basis of this hash value. By performing such processing, it is possible to distributively dispose target data at nodes within controllers 100. Note that there is no limitation to using a file name and a chunk offset and, for example, a determination may alternatively be made on the basis of information such as a file mode number and a chunk serial number, for example. In addition, it may be that a storage destination node is calculated for only one storage destination controller, and a result of this calculation is applied to each storage destination controller.

Finally, the distributed file system control program P11 returns, to the call source node (FE-I/F 110), a target data storage destination node list resulting from converting the storage destination nodes calculated in step S407 into a list (step S409), and ends the processing.

By virtue of the processing for calculating a target data storage destination node as above, it is possible to select nodes (FE-I/Fs 110) in a plurality of controllers 100 as target data storage destination nodes. Accordingly, it is possible to realize data protection that is across controllers 100. Further, a hash value is used for each item of data, whereby it is possible to distributively dispose data to respective nodes connected to the same controller 100.

Regarding which controller 100 a calculated storage destination node is connected to, the target data storage destination node calculation method illustrated in FIG. 10 differs to the calculation method illustrated in FIG. 9 and is not impacted by the number of FE-I/Fs 110 mounted to each controller 100. Accordingly, the calculation method illustrated in FIG. 10 is suitable to, inter alia, a case of attempting to distributively dispose target data uniformly among a plurality of controllers 100 in the storage control apparatus 10.

As described above, the unified storage 1 according to the present embodiment mounts, to each of a plurality of controllers 100, one or more channel adapters (specifically, an FE-I/F 110 having a CPU 113) each having a processor that performs transmission and reception to and from a processor (CPU 130) in a controller 100 after receiving an access request, the processors in a plurality of channel adapters cooperate to cause a distributed file system to operate, and a channel adapter requests two or more controllers 100 to distributively store data, written as a file, to the plurality of controllers 100. To describe in further detail, the distributed file system recognizes the plurality of controllers 100 and distributively stores a plurality of items of data, corresponding to a file for which a write request has been made, to a plurality of volumes corresponding to the plurality of controllers 100 to achieve redundancy across the controllers 100, and thus can maintain availability for this data. By increasing the number of mounted channel adapters on which the distributed file system operates in the controllers 100, it is possible to scale out file performance. Accordingly, the unified storage 1 according to the present embodiment can realize scaling out file processing without adding a server such as a NAS head, and can suppress costs for scaling out.

In other words, in the unified storage 1 according to the present embodiment, the distributed file system recognizes each controller 100, and distributively stores a plurality of items of data corresponding to a file for which a write request has been made to a plurality of volumes corresponding to a plurality of controllers to achieve redundancy between the controllers 100, whereby all data can be accessed even at a time when a failure has occurred for any controller 100 or channel adapter (FE-I/F 110).

Accordingly, by virtue of the unified storage 1 according to the present embodiment, it is possible to maintain availability and scale out file performance, while suppressing costs.

Note that, as functionality pertaining to the block storage in the unified storage 1 according to the present embodiment, in a case of having received an access request for block data, a channel adapter (FE-I/F 110) transfers the access request to the block storage control program P1 without going through the distributed file system. This is similar in other embodiments described below.

(2) Second Embodiment

In a unified storage 1A according to a second embodiment of the present invention, in addition to the configuration of the unified storage 1 according to the first embodiment, each controller 100 has a management hardware (management H/W) 160. A distributed file system control program P61 operates in the management H/W 160 in any one controller 100. However, this distributed file system control program P61 differs to the distributed file system control program P11 in the first embodiment, and performs only processing pertaining to majority logic in the distributed file system, and does not perform a file storage process or the like. The management H/W 160 on which the distributed file system control program P61 is not operating confirms whether a failure has not arisen in the management H/W 160 for another controller 100 and, when a failure has occurred, performs a failover process for the distributed file system control program P61.

Figure 11:
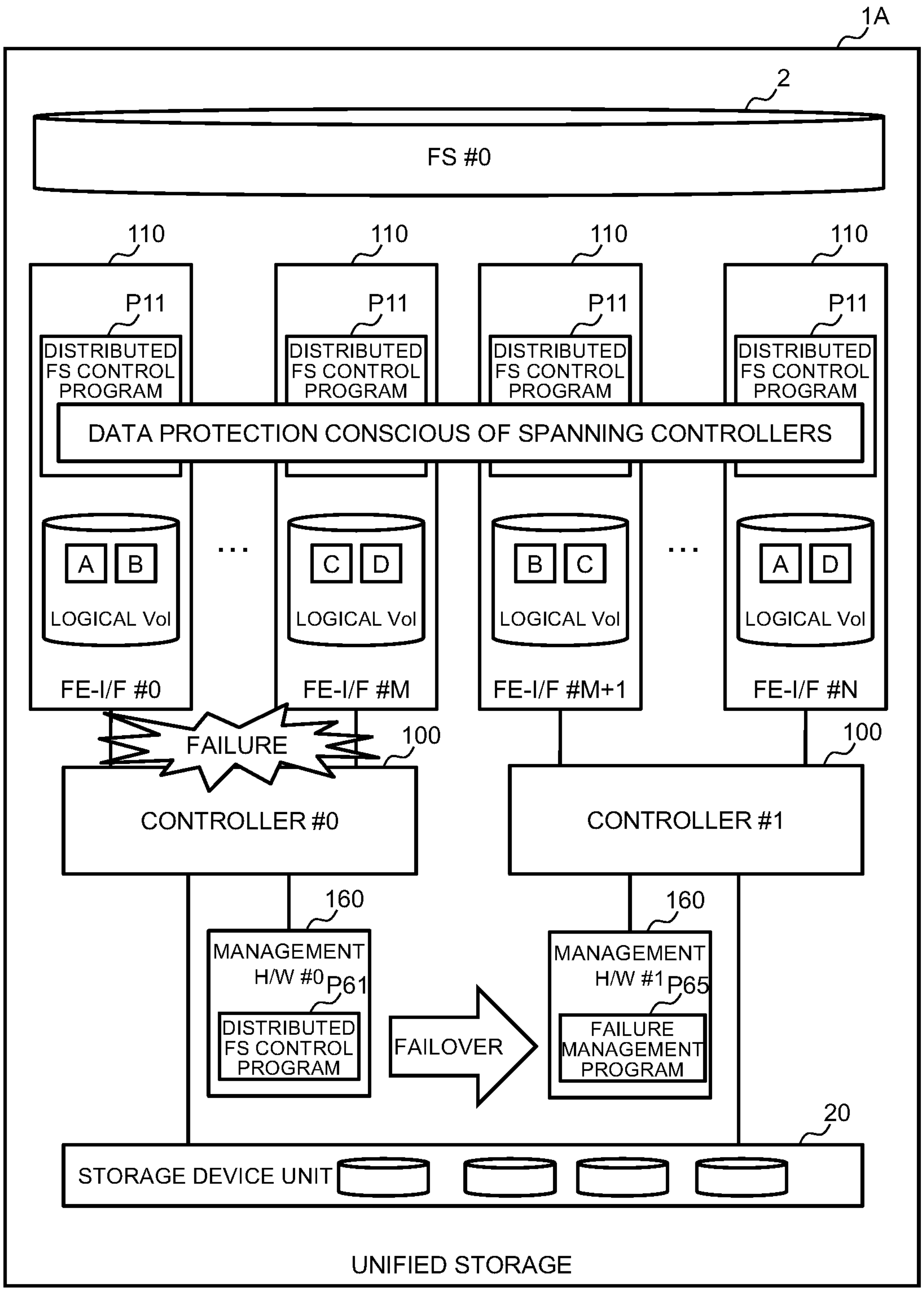
FIG. 11 is a view that illustrates an outline of a unified storage according to a second embodiment.

FIG. 11 is a view that illustrates an outline of the unified storage 1A according to the second embodiment.

As illustrated in FIG. 11, in the unified storage 1A, a failure management program P65 held by a #1 management H/W 160 in a #1 controller 100 monitors for a failure by a #0 management H/W 160 in a #0 controller 100, and performs a failover process for the distributed file system control program P61 when a failure occurs. By such a failover process being performed, the unified storage 1A can maintain the majority logic for the distributed file system even after a failure has occurred for a controller 100, and can continue processing for the distributed file system and reading and writing of data using the majority logic.

Figure 12:
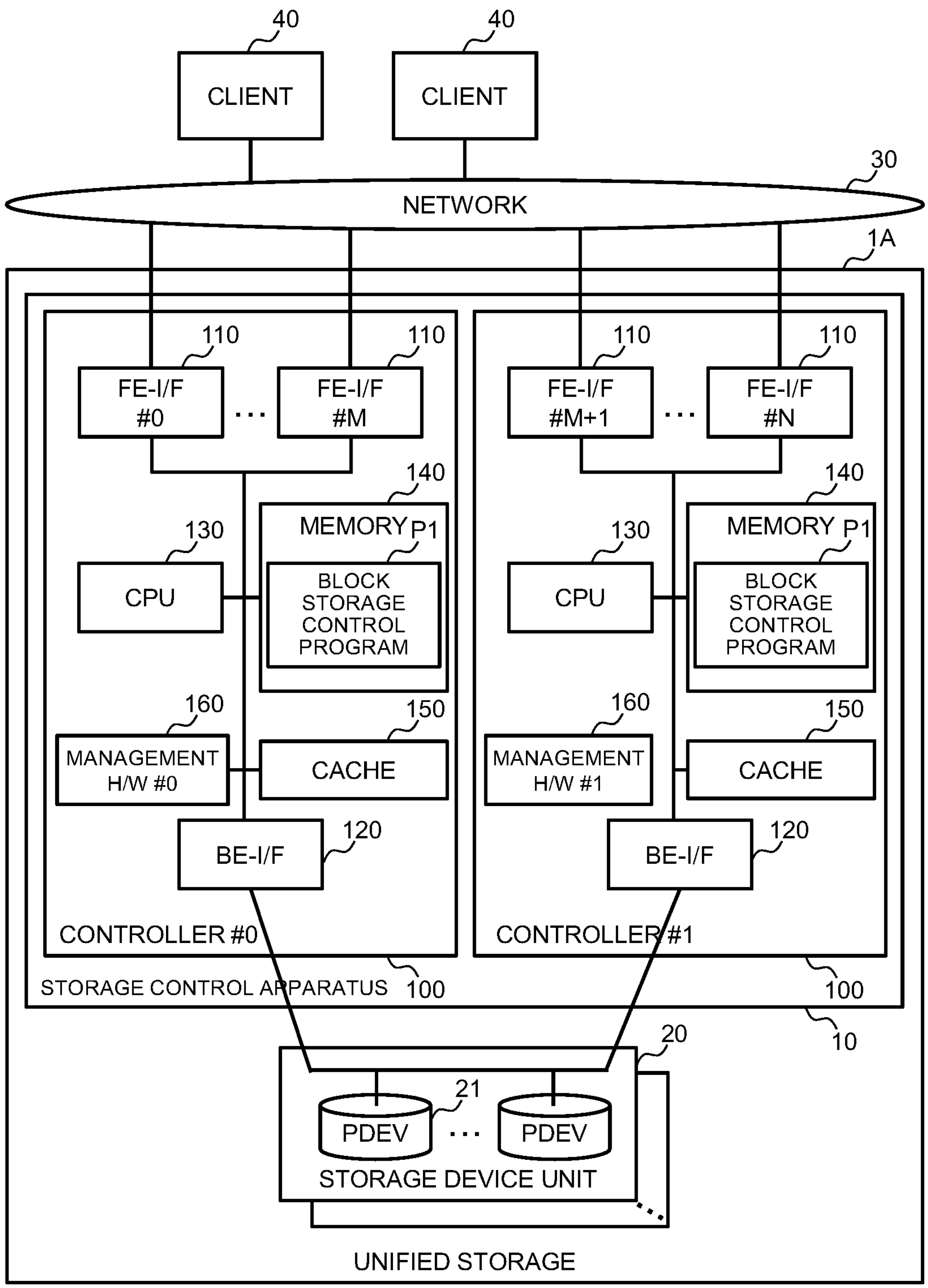
FIG. 12 is a view that illustrates an example of a configuration of the entirety of a storage system that includes the unified storage.

FIG. 12 is a view that illustrates an example of a configuration of the entirety of a storage system that includes the unified storage 1A. From among the components illustrated in FIG. 12, explanation is omitted for a component in common with the first embodiment.

Comparing the configuration in FIG. 12 and the configuration in FIG. 2, it is understood that, for the unified storage 1A according to the second embodiment, the controllers 100 have a management H/W 160 in place of a management terminal 50 being connected to the network 30 as in the first embodiment.

Each management H/W 160 is hardware that is for managing and, in addition to a CPU, a memory, and the like, is provided with a user interface in accordance with a GUI, a CLI, or the like, and provides functionality for a user or an operator to control or monitor the unified storage 1A. In addition, each management H/W 160 executes processing pertaining to the majority logic in the distributed file system, and performs a failover process for the distributed file system control program P61 when a failure has occurred for a management H/W 160 mounted (connected) to a controller 100 different to that for itself.

Figure 13:
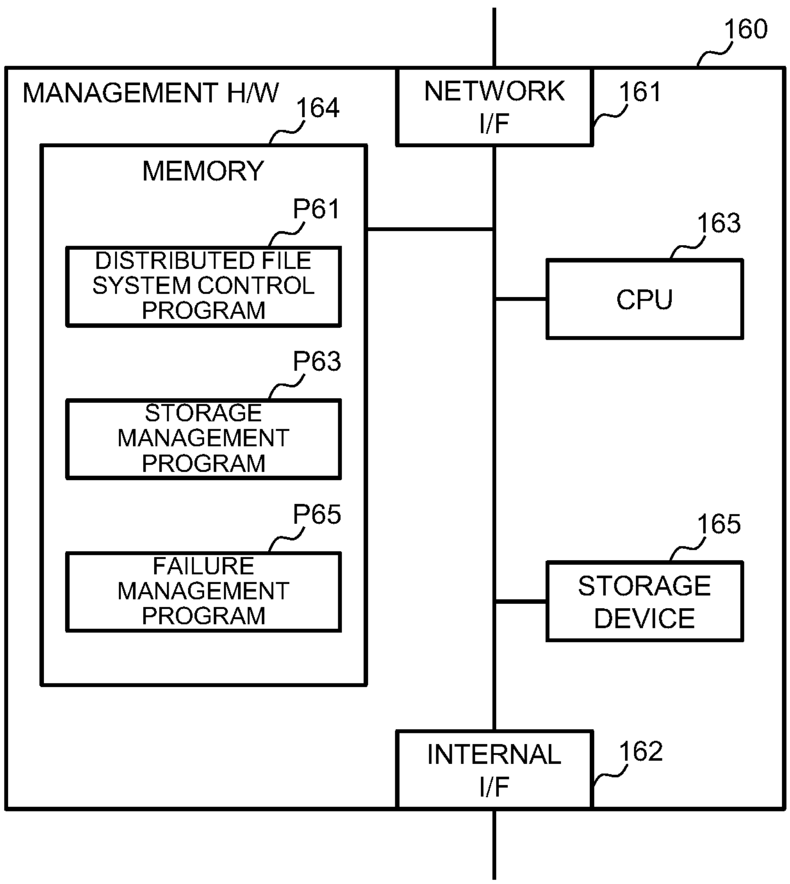
FIG. 13 is a view that illustrates an example of a configuration of a management H/W.

FIG. 13 is a view that illustrates an example of a configuration of a management H/W 160. As illustrated in FIG. 13, the management H/W 160 has a network I/F 161, an internal I/F 162, a CPU 163, a memory 164, and a storage device 165. These components are connected to each other through a communication channel such as a bus, for example.

The network I/F 161 is an interface device for communicating with an external device such as a client 40 or with a distributed file system control program P11 in an FE-I/F 110. Note that communication with an external device such as a client 40 and communication with an FE-I/F 110 may be performed by different network I/Fs. The internal I/F 162 is an interface device for communicating with the block storage control program P1. The internal I/F 162 is, for example, connected by PCIe to, inter alia, a CPU 130 in a controller 100.

The CPU 163 is a processor that performs operation control of the management H/W 160. The memory 164 temporarily stores programs and data used for the operation control by the CPU 163. The memory 164 stores a distributed file system control program P61, a storage management program P63, and a failure management program P65.

The distributed file system control program P61 differs to the distributed file system control program P11 in FE-I/Fs 110 in the first embodiment, and performs only processing pertaining to majority logic in the distributed file system 2, and does not perform a file storage process or the like. Operation by the distributed file system that includes, inter alia, a file storage process is realized by the distributed file system control program P11 in the FE-I/Fs 110 similarly to in the first embodiment. Note that information requiring persistence is not limited to being stored in the memory 164, and may be stored in a logical volume provided by block storage.

The storage management program P63 is provided with a user interface in accordance with a GUI, a CLI, or the like, and provides functionality for a user or an operator to control or monitor the unified storage 1A.

The failure management program P65 is executed by a management H/W 160 on which the distributed file system control program P61 is not operating. The failure management program P65 confirms whether or not a failure has arisen in the management H/W 160 for another controller and, when a failure has occurred, performs a failover process for the distributed file system control program P61.

In other words, at a normal time when a failure has not occurred, the management H/W 160 (for example, the #0 management H/W 160) in one controller 100 (a first controller) performs processing pertaining to the majority logic by executing the distributed file system control program P61, and the management H/W 160 (for example, the #1 management H/W 160) in the other controller 100 (a second controller) executes the failure management program P65 to monitor for the occurrence of a failure in the #0 management H/W 160. In a case where a failure has occurred in the #0 management H/W 160 (may be interpreted as a node or controller connected to this management H/W 160), the failure management program P65 in the #1 management H/W 160 performs a failover process for the distributed file system control program P61 in the #0 management H/W 160.

Note that, in the case for FIG. 11 and FIG. 12, the number of controllers 100 that the unified storage 1A is provided with is two, and it is sufficient if one of these is made to be the first controller and the other is made to be the second controller. In a case where the number of controllers 100 that the unified storage 1A is provided with is three or more, it is sufficient if, inter alia, setting information for dividing these controllers 100 (or management H/Ws 160 mounted to the controllers 100) into pairs is prepared.

The storage device 165 stores, inter alia, an operating system or management information for the management H/W 160.

Figure 14:
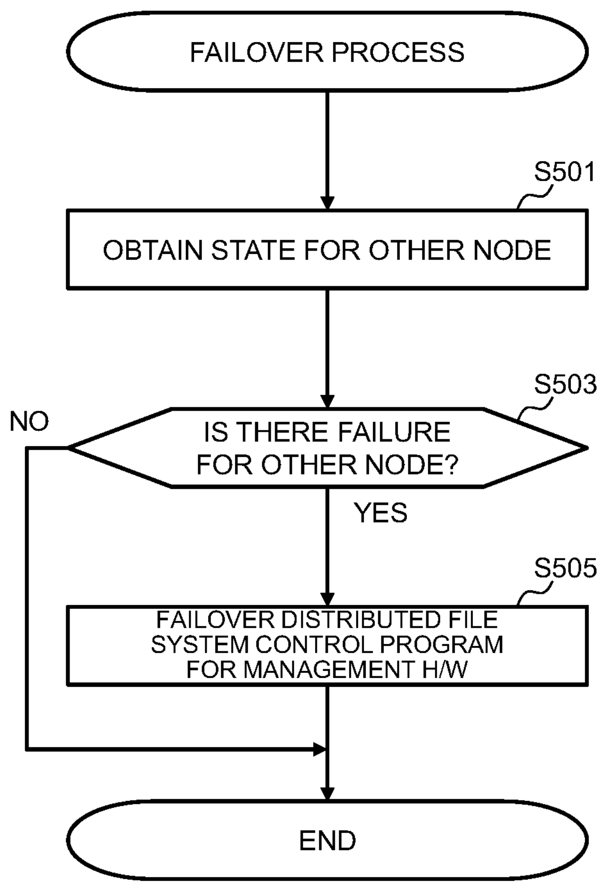
FIG. 14 is a flow chart that illustrates an example of a processing procedure for a failover process in the second embodiment.

FIG. 14 is a flow chart that illustrates an example of a processing procedure for the failover process in the second embodiment. The failover process illustrated in FIG. 14 is performed by the CPU 163 in a management H/W 160 executing the failure management program P65 every certain amount of time, for example.

According to FIG. 14, firstly, the failure management program P65 obtains the state of the other management H/W 160 (step S501), and confirms whether or not a failure has arisen for the other management H/W 160 (step S503). Step S505 is advanced to in a case where a failure has arisen (YES in step S503), and the processing ends in a case where a failure has not arisen (NO in step S503).

In step S505, the failure management program P65 performs a failover for the distributed file system control program P61 in the other management H/W 160. At this time, if necessary for the failover, the failure management program P65 may mount a logical volume used by the distributed file system control program P61 to thereby refer to data.

By a failover process as above being performed, the unified storage 1A according to the second embodiment can maintain the majority logic for the distributed file system even after a failure has occurred for a controller 100, and can continue processing for the distributed file system and reading and writing of data using the majority logic.

In addition, besides the management H/W 160, the unified storage 1A has a configuration similar to that of the unified storage 1 according to the first embodiment, and various types of processes such as a file storage process and a file readout process are executed by processing procedures similar to those in the first embodiment. Accordingly, the unified storage 1A according to the second embodiment can achieve effects similar to those of the unified storage 1 according to the first embodiment.

(3) Third Embodiment

In a unified storage 1B according to a third embodiment of the present invention, similarly to the configuration of the unified storage 1 according to the first embodiment, each of a plurality of controllers 100 is equipped with one or more high-performance FE-I/Fs 170, and CPUs and memories in the FE-I/Fs 170 are used to cause a distributed file system to operate. Further, as a difference from the first embodiment, the unified storage 1B according to the third embodiment performs failure monitoring among the FE-I/Fs 170 across controllers. In a case where a failure has occurred for any controller, a failover process is performed by an FE-I/F 170 in a controller for which a failure has not occurred taking over processing for the FE-I/F 170 in the controller for which the failure has occurred and using data stored by the controller for which a failure has not occurred, from among data stored redundantly (for example, parity or the like) among controllers, to restore data stored in the controller for which the failure has occurred. Note that the third embodiment has a configuration in which data protection is not performed at a file layer, but it may be that data protection is performed by block storage.

Figure 15:
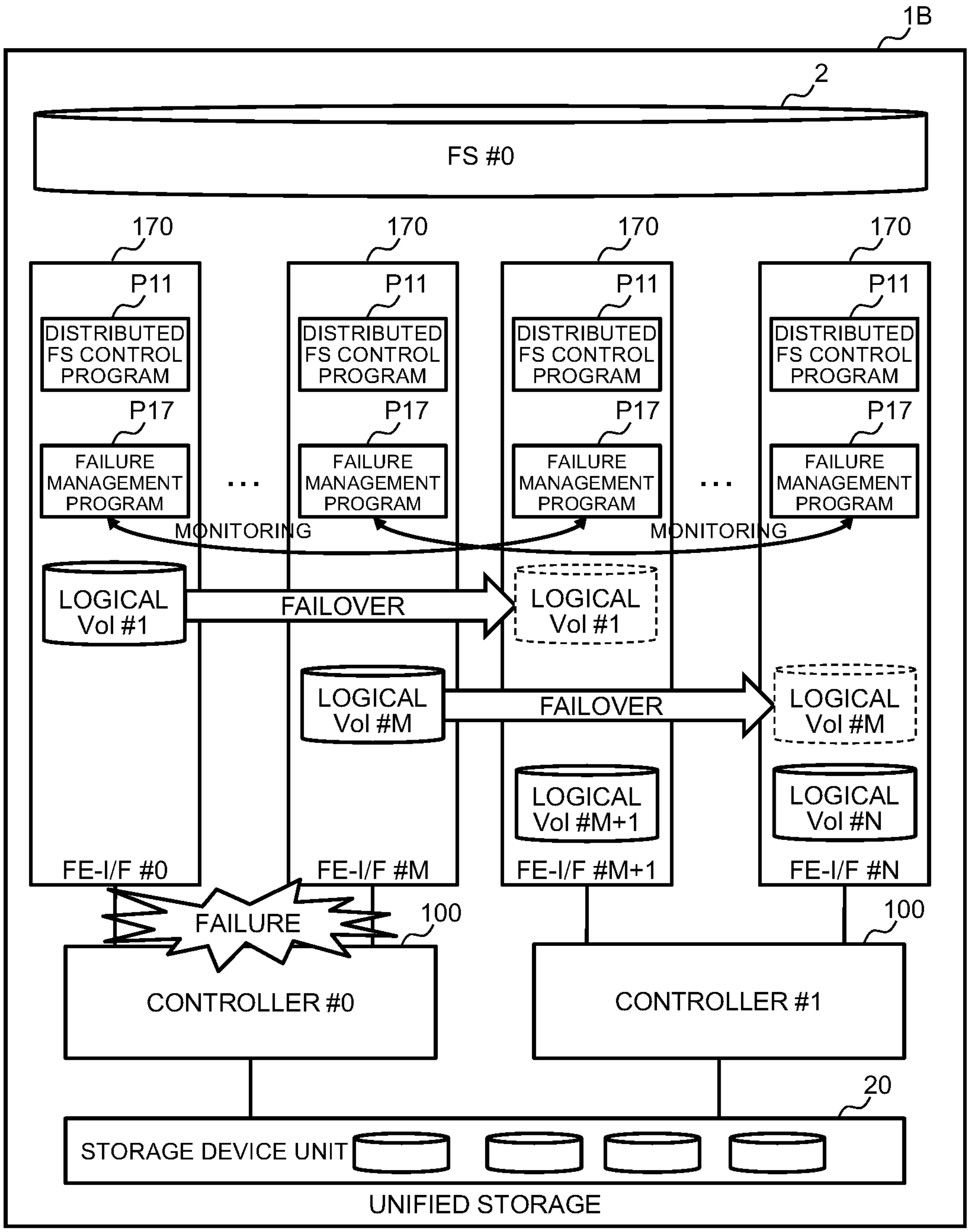
FIG. 15 is a view that illustrates an outline of a unified storage according to a third embodiment.

FIG. 15 is a view that illustrates an outline of the unified storage 1B according to the third embodiment.

As illustrated in FIG. 15, in the unified storage 1B, a #0 controller 100 and a #1 controller 100 are each equipped with one or more FE-I/Fs 170. A distributed file system control program P11 operates in each FE-I/F 170 to thereby configure a distributed file system 2. A failure management program P17 operates in each FE-I/F 170, whereby failure monitoring among FE-I/Fs 170 across the controllers 100 is performed.

In the case in FIG. 15, a failure management program P17 that operates in a #M+1 FE-I/F 170, upon detecting a failure in the #0 FE-I/F 170, allocates a logical volume (#0 logical Vol) that the #0 FE-I/F 170 has used to a logical volume (#M+1 logical Vol) that its own FE-I/F 170 is using. Similarly, a failure management program P17 that operates in a #N FE-I/F 170, upon detecting a failure in a #M FE-I/F 170 that is a monitoring target, allocates a logical volume (#M logical Vol) that the #M FE-I/F 170 has used to a logical volume (#N logical Vol) that its own FE-I/F 170 is using.

By such a failover process being performed, even after a failure has occurred for one controller 100, the unified storage 1B can continue to access data via an FE-I/F 170 in a corresponding other controller 100.

Figure 16:
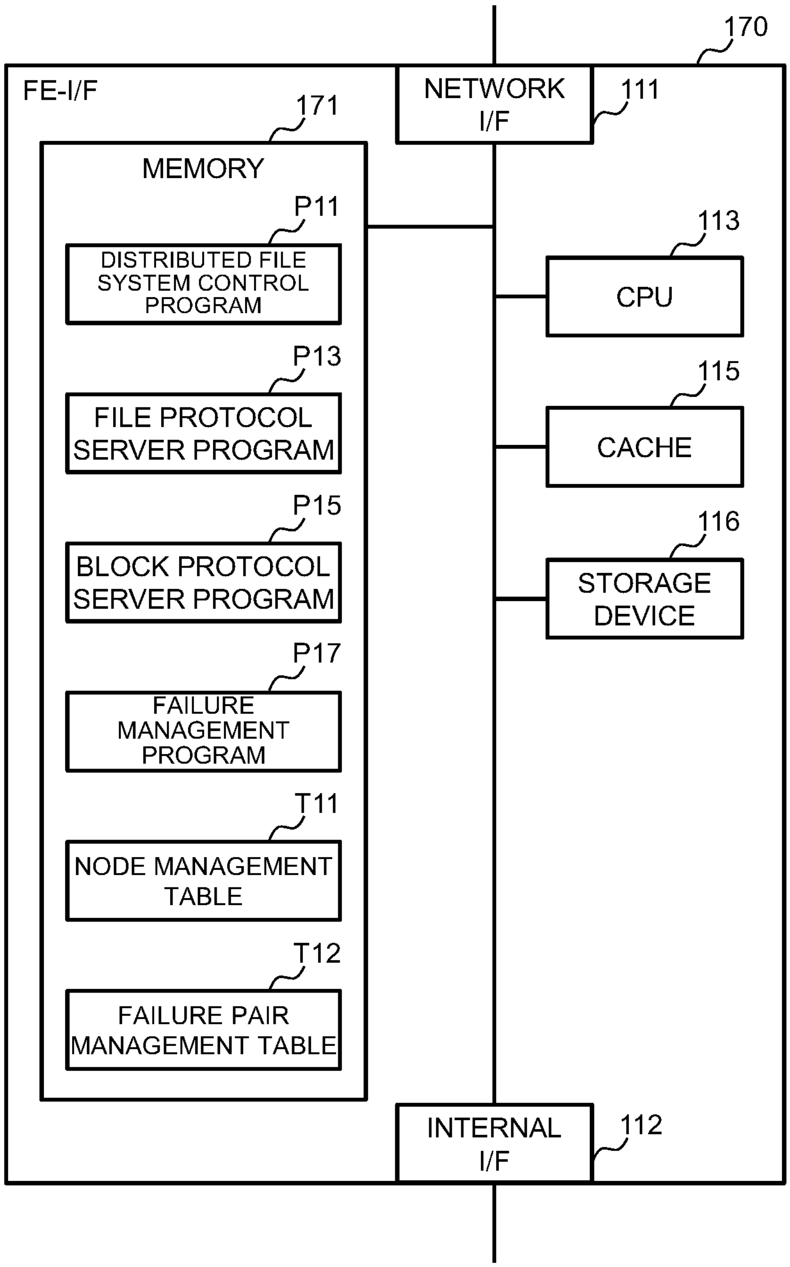
FIG. 16 is a view that illustrates an example of a configuration of an FE-I/F.

FIG. 16 is a view that illustrates an example of a configuration of an FE-I/F 170. As illustrated in FIG. 16, the FE-I/F 170 has a network I/F 111, an internal I/F 112, a CPU 113, a memory 171, a cache 115, and a storage device 116. These components are connected to each other through a communication channel such as a bus, for example. Description is given below regarding components different to those in the FE-I/F 110 illustrated in FIG. 3.

Similarly to the memory 114 in the FE-I/F 110, the memory 171 stores a distributed file system control program P11, a file protocol server program P13, a block protocol server program P15, and a node management table T11. Note that, as a point different to the first embodiment, it may be that the distributed file system control program P11 in the memory 171 only distributively disposes data without performing data protection that is across controllers 100.

As a program and data not in the memory 114 in the FE-I/F 110, the memory 171 stores a failure management program P17 and a failure pair management table T12.

The failure management program P17 identifies a failure pair FE-I/F 170 (failure pair node) on the basis of the failure pair management table T12, and confirms whether or not a failure has arisen for the failure pair node on the basis of the node management table T11. In a case where a failure has arisen for the failure pair node, the failure management program P17 allocates the logical volume used by the distributed file system control program P11 in the failure pair FE-I/F 170 to its own node, and enables access from the distributed file system control program P11 in its own node.

FIG. 17 is a view that illustrates an example of the failure pair management table T12. The failure pair management table T12 manages information regarding a combination (a failure pair) of a node (FE-I/F 170), which monitors for the occurrence of a failure, and a controller 100. It may be that the failure pair management table T12 is created when the system is constructed, and updated by, inter alia, an administrator at a discretionary opportunity.

The failure pair management table T12 illustrated in FIG. 17 is configured by having a node ID pair C21 and a controller ID pair C22. The node ID pair C21 is a combination of identifiers for FE-I/Fs 170 mounted to different controllers 100. The controller ID pair C22 is a combination of identifiers for controllers 100 to which respective FE-I/Fs 170 indicated by the node ID pair C21 are mounted to.

Specifically, for example, a case where a value for the node ID pair C21 is (0, 3) and a value for the controller ID pair C22 is (0, 1) means that the #0 FE-I/F 170 (a node) mounted to the #0 controller 100 and the #3 FE-I/F 170 (a node) mounted to the #1 controller 100 are joined in a failure pair.

Figure 18:
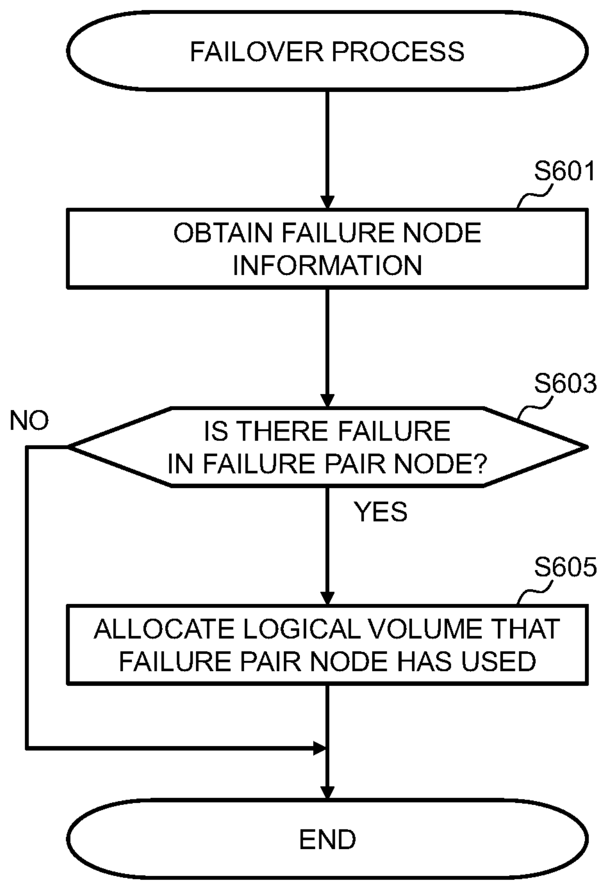
FIG. 18 is a flow chart that illustrates an example of a processing procedure for a failover process in the third embodiment.

FIG. 18 is a flow chart that illustrates an example of a processing procedure for the failover process in the third embodiment. The failover process illustrated in FIG. 18 is, for example, executed each certain amount of time or executed when a failure notification is received from a management terminal 50 (refer to FIG. 2) connected to the unified storage 1B via the network 30. The failover process is performed by the CPU 113 in an FE-I/F 170 mounted to a controller 100 executing the failure management program P17.

According to FIG. 18, firstly, the failure management program P17, referring to the node management table T11, obtains information pertaining to a failure node for which a failure has occurred (step S601). The configuration of the node management table T11 is as exemplified in FIG. 6 in the first embodiment.

Next, the failure management program P17, referring to the failure pair management table T12, confirms whether or not the failure node for which information has been obtained in step S601 is a failure pair node for its own node (step S603). Step S605 is advanced to in a case where the failure node is the failure pair node (YES in step S603), and the process ends in a case where the failure node is not the failure pair node (NO in step S603).

In step S605, the failure management program P17 allocates the logical volume that the distributed file system control program P11 in the failure pair node has used to its own node. Allocation of a logical volume may be performed via the block protocol server program P15 or may be performed by making a direct request to the block storage control program P1 stored in the memory 140 of a controller 100, using the internal I/F 112.

A file storage process and a file readout process in the unified storage 1B according to the third embodiment have similar processing procedures to those illustrated by FIG. 7 and FIG. 8 in the first embodiment. In a case of not protecting data across controllers 100, because redundancy is not achieved, it may be sufficient if one storage destination node is calculated in place of the processing in steps S301 through S305 for the target data storage destination node calculation illustrated in FIG. 9. Further, in a case of not protecting data across controllers 100 in the third embodiment, the example of the processing procedure for the target data storage destination node calculation illustrated in FIG. 10 is not employed.

Note that, although the above-described unified storage 1B is described as not protecting data across controllers 100, as a variation of the third embodiment, it may be that the unified storage 1B employs a redundant configuration similar to that in the first embodiment and protects data across controllers 100.

The unified storage 1B according to the third embodiment as described above has a configuration that does not perform data protection that is across controllers 100 (in other words, data protection among logical volumes on different controllers), but can cause a distributed file system to operate by using a plurality of channel adapters (FE-I/Fs 170) mounted to respective controllers 100. Further, the unified storage 1B according to the third embodiment monitors, through a combination of the abovementioned channel adapters (FE-I/Fs 170) that goes across controllers 100, the occurrence of a failure in a failure pair node in accordance with execution of the failure management program P17 in channel adapters. In a case where a failure has occurred in a controller 100 that includes a channel adapter and a processor (CPU 130), a failover can be realized by a channel adapter in a controller 100 for which a failure has not occurred taking over processing for the channel adapter in the controller 100 for which the failure has occurred, and restoring, on the basis of redundancy, data stored in the controller 100 for which the failure has occurred to continue processing. Accordingly, by virtue of the unified storage 1B according to the third embodiment, the effect of making it possible to maintain availability for a storage system and scale out file performance while suppressing cost increases due to adding servers is achieved.

(4) Fourth Embodiment

In a unified storage 1C according to a fourth embodiment of the present invention, similarly to the configuration of the unified storage 1 according to the first embodiment, each of a plurality of controllers 100 is equipped with one or more high-performance FE-I/Fs 180. As a difference to the first through third embodiments, CPUs and memories in the FE-I/Fs 180 are used to cause local file systems 3 to operate in the unified storage 1C.

In addition, similarly to the unified storage 1B according to the third embodiment, the unified storage 1C performs failure monitoring among FE-I/Fs 180 across controllers. In a case where a failure has occurred for any controller, a failover process is performed by an FE-I/F 180 in a controller for which a failure has not occurred taking over processing for the FE-I/F 180 in the controller for which the failure has occurred and using data stored by the controller for which a failure has not occurred, from among data stored redundantly (for example, parity or the like) among controllers, to restore data stored in the controller for which the failure has occurred. Note that the fourth embodiment protects data by block storage and does not protect data at a file layer.

Figure 19:
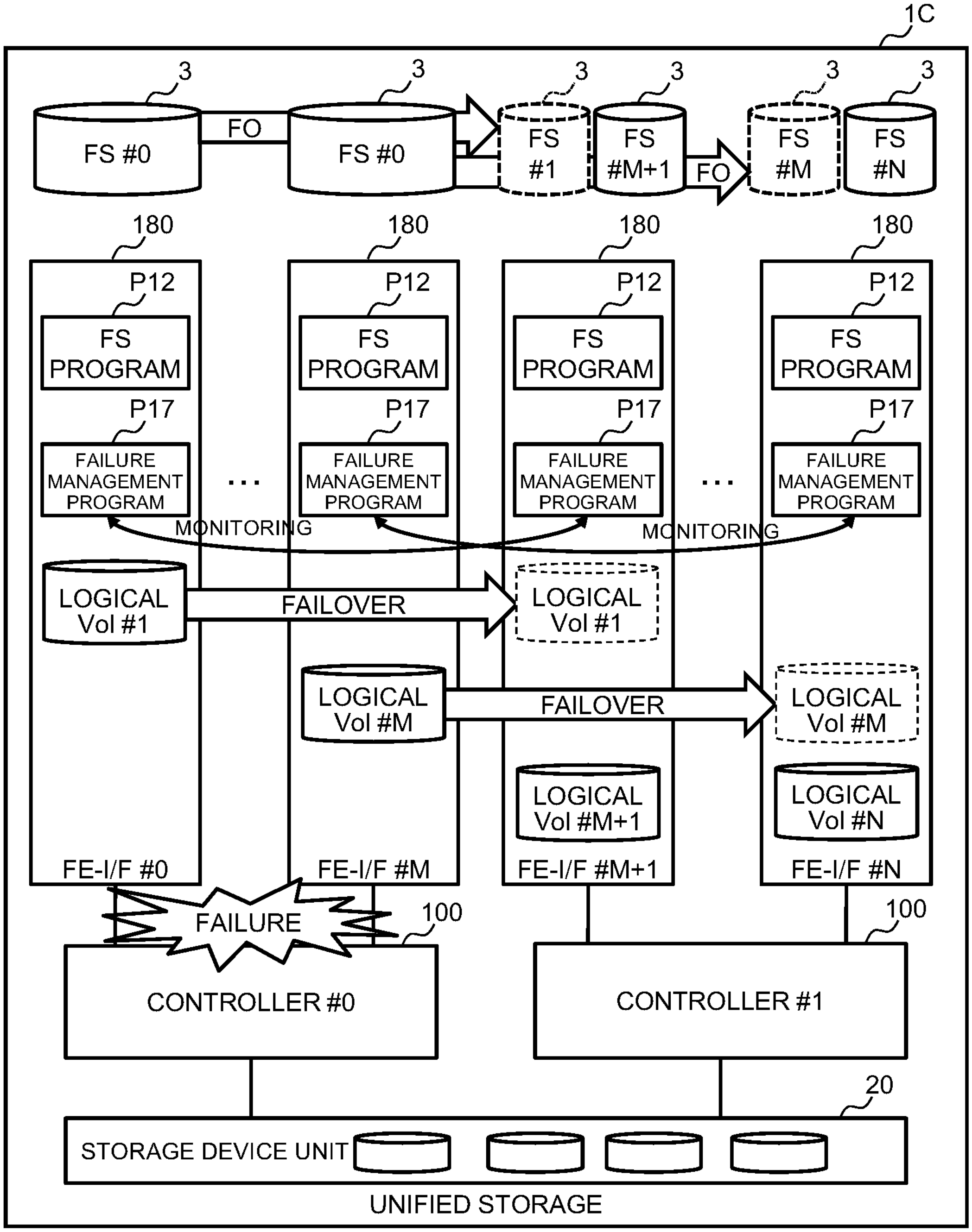
FIG. 19 is a view that illustrates an outline of a unified storage according to a fourth embodiment.

FIG. 19 is a view that illustrates an outline of the unified storage 1C according to the fourth embodiment.

As illustrated in FIG. 19, in the unified storage 1C, a #0 controller 100 and a #1 controller 100 are each equipped with one or more FE-I/Fs 180. A file system program P12 operates in each FE-I/F 180 to thereby configure a file system 3 for each FE-I/F 180. A failure management program P17 operates in each FE-I/F 180, whereby failure monitoring among FE-I/Fs 180 across the controllers 100 is performed. In accordance with the operation of the failure management program P17, a failover process is performed when a failure occurs for a controller 100, whereby, even after a failure has occurred for one controller 100, the unified storage 1C can continue to access data via an FE-I/F 180 in a corresponding other controller 100.

Figure 20:
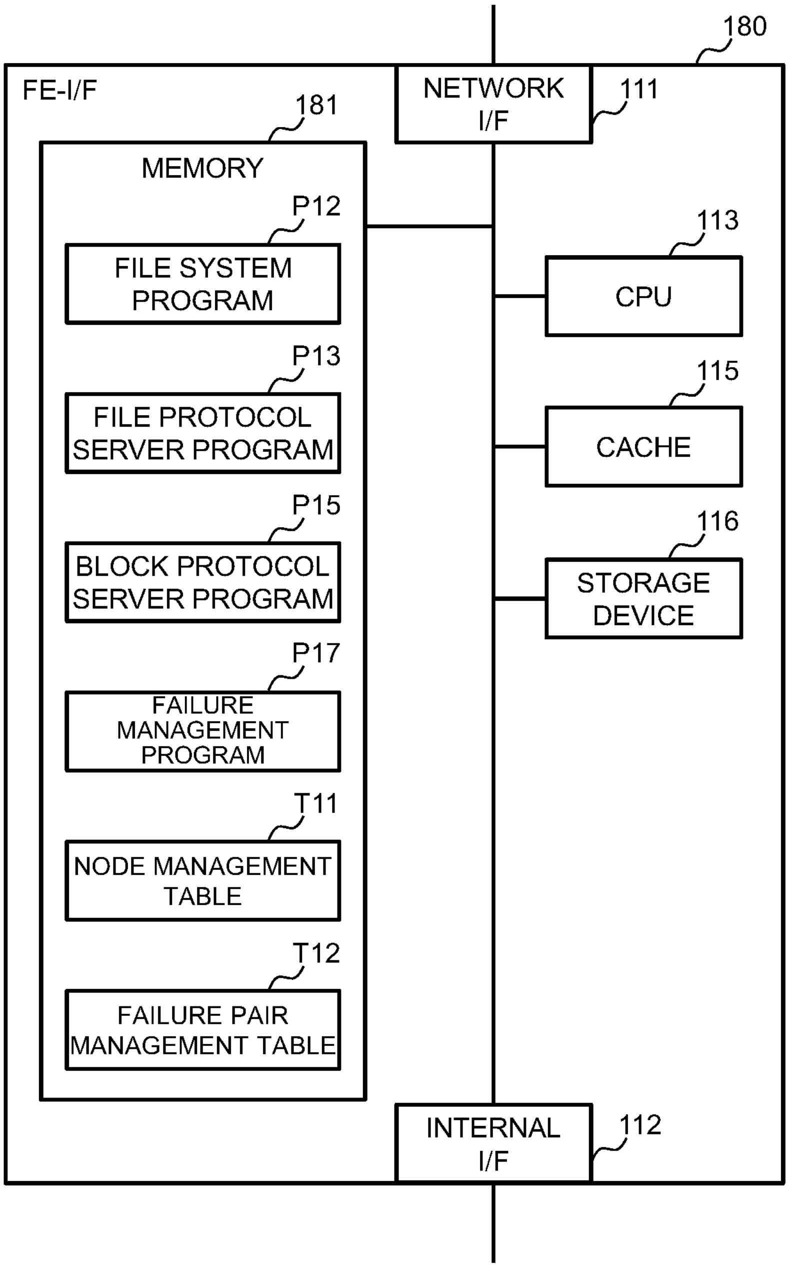
FIG. 20 is a view that illustrates an example of a configuration of an FE-I/F.

FIG. 20 is a view that illustrates an example of a configuration of an FE-I/F 180. Compared to the FE-I/F 170 illustrated in FIG. 16 in the third embodiment, the FE-I/F 180 illustrated in FIG. 20 has, in a memory 181, a file system program P12 in place of the distributed file system control program P11.

The file system program P12, by being executed by the CPU 113, provides a local file system (a file system 3) to the file protocol server program P13. The file system program P12 stores data in a logical volume allocated to itself. Storage of data to a logical volume may be performed via the block protocol server program P15 or may be performed by directly communicating with the block storage control program P1 (refer to FIG. 2) stored in the memory 140 of the controller 100, using the internal I/F 112.

The failure management program P17 identifies a failure pair FE-I/F 180 (failure pair node) on the basis of the failure pair management table T12, and confirms whether or not a failure has arisen for the failure pair node on the basis of the node management table T11. In a case where a failure has arisen for the failure pair node, the failure management program P17 allocates the logical volume used by the file system program P12 in the failure pair FE-I/F 180 to its own node, and enables access from the file system program P12 in its own node.

Figure 21:
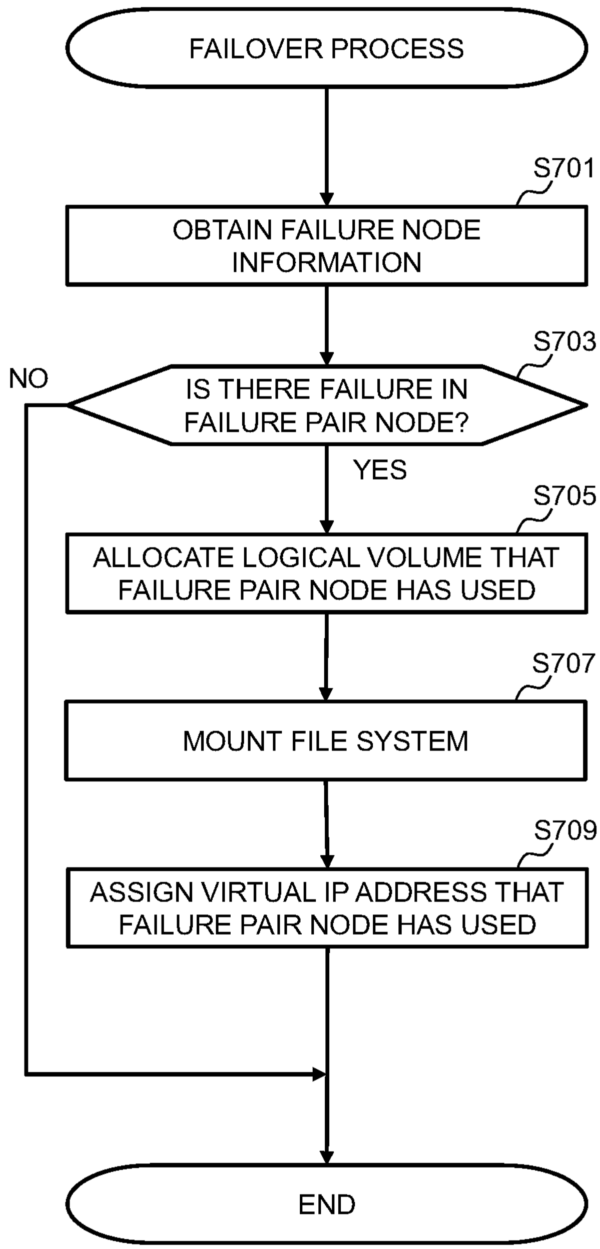
FIG. 21 is a flow chart that illustrates an example of a processing procedure for a failover process in the fourth embodiment.

FIG. 21 is a flow chart that illustrates an example of a processing procedure for the failover process in the fourth embodiment. The failover process illustrated in FIG. 21 is, for example, executed each certain amount of time or executed when a failure notification is received from a management terminal 50 (refer to FIG. 2) connected to the unified storage 1C via the network 30. The failover process is performed by the CPU 113 in an FE-I/F 180 mounted to a controller 100 executing the failure management program P17.

According to FIG. 21, firstly, the failure management program P17, referring to the node management table T11, obtains information pertaining to a failure node for which a failure has occurred (step S701). The configuration of the node management table T11 is as exemplified in FIG. 6 in the first embodiment.

Next, the failure management program P17, referring to the failure pair management table T12, confirms whether or not the failure node for which information has been obtained in step S701 is a failure pair node for its own node (step S703). The configuration of the failure pair management table T12 is as exemplified in FIG. 17 in the third embodiment. Step S705 is advanced to in a case where the failure node is the failure pair node in step S703 (YES in step S703), and the process ends in a case where the failure node is not the failure pair node (NO in step S703).

In step S705, the failure management program P17 allocates the logical volume that the file system program P12 in the failure pair node has used to its own node. Allocation of a logical volume may be performed via the block protocol server program P15 or may be performed by making a direct request to the block storage control program P1 stored in the memory 140 of a controller 100, using the internal I/F 112.

Next, the failure management program P17 mounts a file system from the logical volume allocated in step S705, and provides the file system 3 to the file protocol server program P13 (step S707).

The failure management program P17 assigns a virtual internet protocol (IP) address that the failure pair node has used to its own node (step S709), and the process ends.

By the failover process as above being executed, even after a failure has occurred in a controller 100, the unified storage 1C according to the fourth embodiment can continue to access data via the failure pair node belonging to a corresponding controller (refer to the controller ID pair C22 and the node ID pair C21 in FIG. 17).

What is claimed is:

1. A unified storage configured to function as a block storage and a file storage, the unified storage comprising:

a plurality of controllers that are storage controllers; and a storage apparatus, wherein each of the plurality of controllers is equipped with one or more main processors and one or more channel adapters, each main processor processes data inputted to and outputted from the storage apparatus by causing a block storage control program to operate, each channel adapter has a processor and the processor performs transmission and reception to and from the one or more main processors after accepting an access request, and the processors in a plurality of the channel adapters cooperate to cause a distributed file system to operate, and make a request to the plurality of controllers to distributively store data that is written as a file, wherein each channel adapter requests the main processors in two or more of the controllers to store data by taking a redundant configuration across the controllers.

2. The unified storage according to claim 1, wherein the block storage control program in each controller provides a volume, the processor in each channel adapter stores data to the volume, one of the controllers can provide a plurality of volumes, and the distributed file system recognizes the plurality of controllers and distributively stores a plurality of items of data corresponding to the file to a plurality of volumes corresponding to a plurality of controllers to achieve redundancy across controllers.

3. The unified storage according to claim 2, wherein, when any channel adapter has accepted a storage request for a file, a distributed file system control program executed by the channel adapter determines, on a basis of the storage request, one channel adapter to set as a data storage destination for the file, repeats a process to sequentially select one channel adapter from the plurality of channel adapters mounted to the plurality of controllers, and in a case where the determined channel adapter and the selected channel adapter are mounted to different controllers, determines both channel adapters to be channel adapters for the data storage destination.

4. The unified storage according to claim 2, wherein, when any channel adapter has accepted a storage request for a file, a distributed file system control program executed by the channel adapter determines, on a basis of the storage request, one controller that has a data storage destination for the file, repeats a process to sequentially select one controller from the plurality of controllers, and in a case where the determined controller and the selected controller are different, determines respective channel adapters, from among both controllers, to set as the data storage destination.

5. The unified storage according to claim 1, wherein each of the plurality of controllers is equipped with a management hardware that has a processor and a storage resource, the plurality of controllers are set in a pair relation between a self controller and one other controller, a first management hardware on one controller in the pair relation, by the processor executing a first program stored in the storage resource in the first management hardware, causes processing pertaining to majority logic for the distributed file system that operates in accordance with a distributed file system control program to operate, and a second management hardware on the other controller in the pair relation, by the processor executing a second program stored in the storage resource in the second management hardware, performs failure monitoring for the first management hardware and performs a failover for the distributed file system in a case where a failure has occurred for the first management hardware.

6. The unified storage according to claim 1, wherein, in a case where a failure has occurred in a controller that includes a channel adapter and a main processor, a channel adapter belonging to a controller for which the failure has not occurred takes over processing for the channel adapter belonging to the controller for which the failure has occurred, and uses data stored by the controller for which the failure has not occurred, from among data redundantly stored across controllers, to restore, on a basis of the redundancy, data stored by the controller for which the failure has occurred, and continue processing.

7. The unified storage according to claim 1, wherein each channel adapter is a smart network interface card (NIC).

8. The unified storage according to claim 1, wherein a channel adapter, in a case of receiving an access request to block data, transfers the access request to the block storage control program without going through the distributed file system.

9. A method of controlling a unified storage configured to function as a block storage and a file storage, wherein the unified storage has a plurality of controllers that are storage controllers and a storage apparatus, each of the plurality of controllers is equipped with one or more main processors and one or more channel adapters, each main processor processes data inputted to and outputted from the storage apparatus by causing a block storage control program to operate, each channel adapter has a processor and the processor performs transmission and reception to and from the one or more main processors after accepting an access request, and the processors in a plurality of the channel adapters cooperate to cause a distributed file system to operate, and distributively store data that is written as a file, to the plurality of controllers, wherein each channel adapter requests the main processors in two or more of the controllers to store data by taking a redundant configuration across the controllers.

10. A unified storage configured to function as a block storage and a file storage, the unified storage comprising:

a plurality of controllers that are storage controllers; and a storage apparatus, wherein each of the plurality of controllers is equipped with one or more main processors and one or more channel adapters, each main processor processes data inputted to and outputted from the storage apparatus by causing a block storage control program to operate, each channel adapter has a processor and the processor performs transmission and reception to and from the one or more main processors after accepting an access request, and the processors in a plurality of the channel adapters cooperate to cause a distributed file system to operate, and make a request to the plurality of controllers to distributively store data that is written as a file, wherein a channel adapter, in a case of receiving an access request to block data, transfers the access request to the block storage control program without going through the distributed file system.

* * * * *